US012611767B2

(12) United States Patent
Reher

(10) Patent No.: US 12,611,767 B2
(45) Date of Patent: Apr. 28, 2026

(54) SYSTEM AND METHOD FOR EFFICIENT CONTROL OF A HUMANOID ROBOT

(71) Applicant: Figure AI Inc., San Jose, CA (US)

(72) Inventor: Jenna Reher, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/322,446

(22) Filed: Sep. 8, 2025

(65) Prior Publication Data

US 2026/0070212 A1     Mar. 12, 2026

Related U.S. Application Data

(60) Provisional application No. 63/691,599, filed on Sep. 6, 2024.

(51) Int. Cl.
*B25J 9/16* (2006.01)
*B25J 13/00* (2006.01)
*G06N 3/008* (2023.01)

(52) U.S. Cl.
CPC ........... *B25J 9/1605* (2013.01); *B25J 13/003* (2013.01); *G06N 3/008* (2013.01)

(58) Field of Classification Search
CPC ........ B25J 9/1605; B25J 13/003; G06N 3/008
See application file for complete search history.

(56) References Cited

U.S. PATENT DOCUMENTS

| | | | |
|---|---|---|---|
| 5,673,367 A | 9/1997 | Buckley | |
| 7,024,276 B2 | 4/2006 | Ito | |
| 7,072,741 B2 | 7/2006 | Nagashima | |
| 7,308,336 B2 | 12/2007 | Takenaka | |
| 7,319,918 B2 | 1/2008 | Takenaka | |
| 7,386,364 B2 | 6/2008 | Mikami | |
| 7,664,569 B2 | 2/2010 | Shimizu | |
| D641,808 S | 7/2011 | Matsuda | |
| 8,224,652 B2 | 7/2012 | Wang | |
| D677,743 S | 3/2013 | Koshiishi | |

(Continued)

FOREIGN PATENT DOCUMENTS

| | | |
|---|---|---|
| CN | 102357889 | 2/2012 |
| CN | 209615545 | 11/2019 |

(Continued)

OTHER PUBLICATIONS

English Translation of CN-118809620-A (Year: 2024).*

(Continued)

*Primary Examiner* — Basil T. Jos

(57) ABSTRACT

The present disclosure provides a method for controlling a humanoid robot. The method comprises identifying a task for the humanoid robot to perform and establishing a safety-related limit. The method includes constructing a phantom inverse kinematics task mathematically derived from the identified task to regularize the robot's pose. The method formulates a combined inverse kinematics problem incorporating the task, phantom inverse kinematics task, and safety-related limit. The method solves the inverse kinematics problem to generate target joint parameters that satisfy the task while remaining within the safety-related limit. The method provides the target joint parameters to actuators to effect physical movement of the humanoid robot.

10 Claims, 13 Drawing Sheets

(56)     References Cited

U.S. PATENT DOCUMENTS

| | | | |
|---|---|---|---|
| D687,908 | S | 8/2013 | Hoang |
| D689,566 | S | 9/2013 | Wong |
| 8,942,849 | B2 | 1/2015 | Maisonnier |
| 9,205,560 | B1 | 12/2015 | Edsinger |
| 9,302,393 | B1 | 4/2016 | Rosen |
| 9,494,415 | B2 | 11/2016 | Sweetser |
| 9,569,976 | B2 | 2/2017 | Krauss |
| D794,692 | S | 8/2017 | Haranaka |
| D795,320 | S | 8/2017 | Liu |
| D795,321 | S | 8/2017 | Liu |
| 9,789,607 | B1 | 10/2017 | Whitman |
| 9,842,585 | B2 | 12/2017 | Huang |
| 9,868,210 | B1 | 1/2018 | Whitman |
| D835,214 | S | 12/2018 | Xiong |
| D838,759 | S | 1/2019 | Kowalski |
| D841,708 | S | 2/2019 | Koshiishi |
| 10,203,209 | B2 | 2/2019 | Roumeliotis |
| 10,349,245 | B2 | 7/2019 | Tokuchi |
| D866,684 | S | 11/2019 | Früh |
| D868,866 | S | 12/2019 | Gable |
| D872,152 | S | 1/2020 | Xiong |
| D873,320 | S | 1/2020 | Clerc |
| 10,545,497 | B1 | 1/2020 | Cui |
| 10,571,896 | B2 | 2/2020 | Benaim |
| D885,451 | S | 5/2020 | Chen |
| D888,120 | S | 6/2020 | Hurst |
| D892,886 | S | 8/2020 | Klassen |
| D892,887 | S | 8/2020 | Klassen |
| D893,573 | S | 8/2020 | Yan |
| D898,789 | S | 10/2020 | Nazarikhorram |
| D911,459 | S | 2/2021 | Xiong |
| 10,946,528 | B2 | 3/2021 | Gupta |
| 10,960,539 | B1 | 3/2021 | Kalakrishnan |
| D932,531 | S | 10/2021 | Xu |
| 11,188,821 | B1 | 11/2021 | Kalakrishnan |
| 11,247,738 | B2 | 2/2022 | Lavalley |
| 11,416,003 | B2 | 8/2022 | Whitman |
| 11,498,223 | B2 | 11/2022 | Williams |
| 11,546,504 | B2 | 1/2023 | Kim |
| 11,600,010 | B2 | 3/2023 | Doutre |
| D985,643 | S | 5/2023 | Li |
| 11,645,444 | B2 | 5/2023 | Scheutz |
| 11,736,677 | B2 | 8/2023 | Grunnet-Jepsen |
| 11,833,680 | B2 | 12/2023 | Deits |
| 11,851,120 | B2 | 12/2023 | Fay |
| 11,999,423 | B2 | 6/2024 | Whitman |
| 12,054,208 | B2 | 8/2024 | Swilling |
| 12,070,863 | B2 | 8/2024 | Whitman |
| 12,077,229 | B2 | 9/2024 | Whitman |
| 12,097,626 | B2 | 9/2024 | Ikeda |
| D1,051,193 | S | 11/2024 | Mahoor |
| 12,134,181 | B2 | 11/2024 | Klingensmith |
| 12,172,537 | B2 | 12/2024 | Gonano |
| 12,205,214 | B2 | 1/2025 | Starke |
| 12,214,497 | B2 | 2/2025 | Whitman |
| 12,235,652 | B2 | 2/2025 | Whitman |
| 12,240,117 | B2 | 3/2025 | Chebotar |
| D1,069,875 | S | 4/2025 | Belon |
| 12,290,940 | B1 | 5/2025 | Abate |
| D1,082,881 | S | 7/2025 | Wang |
| 12,365,094 | B2 | 7/2025 | Mccall |
| 12,403,611 | B2 | 9/2025 | Mccall |
| 12,515,706 | B2 | 1/2026 | Li |
| 2002/0103576 | A1 | 8/2002 | Takamura |
| 2003/0060930 | A1 | 3/2003 | Fujita |
| 2004/0015265 | A1 | 1/2004 | Asano |
| 2004/0019485 | A1 | 1/2004 | Kobayashi |
| 2004/0039483 | A1 | 2/2004 | Kemp |
| 2006/0217838 | A1 | 9/2006 | Sugino |
| 2009/0059033 | A1 | 3/2009 | Shimada |
| 2010/0280662 | A1 | 11/2010 | Abdallah |
| 2011/0058800 | A1 | 3/2011 | Lee |
| 2011/0071671 | A1 | 3/2011 | Ihrke |
| 2012/0072215 | A1 | 3/2012 | Yu |
| 2012/0078419 | A1 | 3/2012 | Kim |

| | | | |
|---|---|---|---|
| 2012/0215539 | A1 | 8/2012 | Juneja |
| 2012/0310412 | A1 | 12/2012 | Seo |
| 2013/0175816 | A1 | 7/2013 | Kawasaki |
| 2013/0345863 | A1 | 12/2013 | Linder |
| 2014/0039675 | A1 | 2/2014 | Ead |
| 2015/0192399 | A1 | 7/2015 | Raab |
| 2015/0290795 | A1 | 10/2015 | Oleynik |
| 2016/0008988 | A1 | 1/2016 | Kennedy |
| 2016/0064263 | A1 | 3/2016 | Hosek |
| 2017/0028551 | A1 | 2/2017 | Hemken |
| 2017/0028563 | A1 | 2/2017 | Hemken |
| 2017/0080582 | A1 | 3/2017 | Mugnier |
| 2017/0125008 | A1 | 5/2017 | Maisonnier |
| 2017/0326736 | A1 | 11/2017 | Nagatsuka |
| 2018/0136912 | A1 | 5/2018 | Venkataramani |
| 2018/0182260 | A1 | 6/2018 | Ciniello |
| 2018/0232201 | A1 | 8/2018 | Holtmann |
| 2018/0357552 | A1 | 12/2018 | Campos |
| 2019/0005374 | A1 | 1/2019 | Shankar |
| 2019/0079924 | A1 | 3/2019 | Sugiura |
| 2019/0100263 | A1 | 4/2019 | Amino |
| 2019/0163985 | A1 | 5/2019 | Wang |
| 2019/0329413 | A1 | 10/2019 | Johnson |
| 2019/0371307 | A1 | 12/2019 | Zhao |
| 2020/0009739 | A1 | 1/2020 | Moon |
| 2020/0086479 | A1 | 3/2020 | Messier |
| 2020/0117336 | A1 | 4/2020 | Mani |
| 2021/0390420 | A1 | 12/2021 | Barnett |
| 2022/0226996 | A1 | 7/2022 | Ishizuka |
| 2022/0294062 | A1 | 9/2022 | Kamon |
| 2022/0388174 | A1 | 12/2022 | Stathis |
| 2022/0390952 | A1 | 12/2022 | Yu |
| 2022/0410380 | A1 | 12/2022 | Lu |
| 2023/0048725 | A1 | 2/2023 | Barbour |
| 2023/0126906 | A1 | 4/2023 | Kranski |
| 2023/0143315 | A1 | 5/2023 | Whitman |
| 2023/0168921 | A1 | 6/2023 | Kim |
| 2023/0173683 | A1 | 6/2023 | Gomez |
| 2023/0182296 | A1 | 6/2023 | Sermanet |
| 2023/0222454 | A1 | 7/2023 | Cella |
| 2023/0306302 | A1 | 9/2023 | Mori |
| 2023/0347514 | A1 | 11/2023 | Xiao |
| 2023/0390948 | A1 | 12/2023 | Hsu |
| 2024/0091964 | A1 | 3/2024 | Smith |
| 2024/0095077 | A1 | 3/2024 | Singh |
| 2024/0181637 | A1 | 6/2024 | Gillett |
| 2024/0193848 | A1 | 6/2024 | Wang |
| 2024/0199068 | A1 | 6/2024 | Pavone |
| 2024/0217104 | A1 | 7/2024 | Neville |
| 2024/0228191 | A1 | 7/2024 | Kumar |
| 2025/0050507 | A1 | 2/2025 | Camasmie |
| 2025/0147517 | A1 | 5/2025 | Swilling |
| 2025/0196326 | A1 | 6/2025 | Katz |
| 2025/0196327 | A1 | 6/2025 | Geating |
| 2025/0218160 | A1 | 7/2025 | Wang |

FOREIGN PATENT DOCUMENTS

| | | | | |
|---|---|---|---|---|
| CN | 210998685 | | 7/2020 | |
| CN | 115649316 | | 1/2023 | |
| CN | 218802294 | | 4/2023 | |
| CN | 117301022 | | 12/2023 | |
| CN | 117462367 | | 1/2024 | |
| CN | 118809620 | A  * | 10/2024 | ............ B25J 9/1605 |
| KR | 3020240036125 | | 9/2024 | |
| SU | 1734994 | | 5/1992 | |
| WO | 2023107501 | | 6/2023 | |
| WO | 2023110778 | | 6/2023 | |
| WO | 2023246994 | | 12/2023 | |
| WO | 2023246995 | | 12/2023 | |
| WO | 2024058844 | | 3/2024 | |
| WO | 2024085904 | | 4/2024 | |
| WO | 2024112350 | | 5/2024 | |
| WO | 2024112351 | | 5/2024 | |
| WO | 2024123766 | | 6/2024 | |
| WO | 2024163992 | | 8/2024 | |
| WO | 2025019583 | | 1/2025 | |

(56) References Cited

FOREIGN PATENT DOCUMENTS

WO        2025042802        2/2025
WO        2025072321        4/2025

OTHER PUBLICATIONS

Available online at https://www.youtube.com/watch?v=q8ldbodRG14, at least as early as May 22, 2019.
Available online at https://youtu.be/GtPs__ygfaEA?si=7lv6MEFvFoaackFa, at least as early as Aug. 15, 2023.
Available online at https://www.youtube.com/watch?v=FuNFr7V7FQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as.
Available online at https://www.youtube.com/watch?v=-9EM5_VFlt8, at least as.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=B_12k7MZEKg, at least as.
Available online at https://www.youtube.com/watch?v=zLhA-RWBBYU, at least as.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., "Intel RealSense stereoscopic depth cameras," in Proceedings of the IEEE Conference on Computer Vision and Pattern Recognition Workshops, pp. 1-10, 2017.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of ARMAR III, 2006, IEEE, p. 308-309 (Year: 2006).
Brown et al., "Language Models are Few-Shot Learners," arXiv:2005.14165v4 (Jul. 22, 2020).
Chang et al., "A Survey on Evaluation of Large Language Models," ACM Trans. Intell. Syst. Technol., vol. 15, No. 3, Article 39. (Mar. 2024).
Chen et al., "InternVL: Scaling up Vision Foundation Models and Aligning for Generic Visual-Linguistic Tasks," https://github.com/OpenGVLab/InternVL (2024).
Gia et al., "Densely Connected Feature Pyramid Network for Image Segmentation," 2020 8th International Conference on Digital Home (ICDH).
Jin et al., "Unified Language-Vision Pretraining in LLM With Dynamic Discrete Visual Tokenization," arXiv:2309.04669v3 [cs.CV] Mar. 22, 2024.
Kim et al., "Parallel Feature Pyramid Network for Object Detection," ECCV 2018.
Kim et al., "Giving Robots a Hand: Learning Generalizable Manipulation with Eye-in-Hand Human Video Demonstrations," arXiv:2307.05959v1 (Jul. 12, 2023).
Kirillov et al., "Panoptic Feature Pyramid Networks," IEEE Xplore (2019).
Lee et al., "Learning Robot Activities from First-Person Human Videos Using Convolutional Future Regression," IEEE Xplore (2017).
Li et al., "Supervision Exists Everywhere: a Data Efficient Contrastive Language-Image Pre-Training Paradigm," arXiv:2110.05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lin et al., "Feature Pyramid Networks for Object Detection," IEEE Xplore (2017).
Lin et al., "Feature Pyramid Networks for Object Detection," IEEE Xplore (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).
Liu et al., "ROBERTa: A Robustly Optimized BERT Pretraining Approach," arXiv:1907.11692v1 (Jul. 26, 2019).

(56) References Cited

OTHER PUBLICATIONS

Liu et al., "Improved Baselines with Visual Instruction Tuning," IEEE Xplore (2024).

Liu et al., "Visual Instruction Tuning," 37th Conference on Neural Information Processing Systems (NeurIPS 2023).

Lin et al., "VILA: On Pre-training for Visual Language Models," https://github.com/Efficient-Large-Model/VILA (2024).

Mandi et al., "Towards More Generalizable One-shot Visual Imitation Learning," bencharXiv: 2110.13423v2 [cs.RO] Feb. 8, 2022.

Maniparambil et al., "Do Vision and Language Encoders Represent the World Similarly?" IEEE Xplore (2024).

Peng et al., "DeepMimic: Example-Guided Deep Reinforcement Learning of Physics-Based Character Skills," ACM Trans. Graph., vol. 37, No. 4, Article 143. Publication date: Aug. 2018.

Radford et al., "Improving Language Understanding by Generative Pre-Training," 2018.

Radford et al., "Language Models are Unsupervised Multitask Learners," 2019.

Radford et al., "Learning Transferable Visual Models From Natural Language Supervision," Proceedings of the 38 th International Conference on Machine Learning, PMLR 139, 2021.

Raffel et al., "Exploring the Limits of Transfer Learning with a Unified Text-to-Text Transformer," Journal of Machine Learning Research 21 (2020) 1-67.

Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).

Rombach et al., "High-Resolution Image Synthesis with Latent Diffusion Models," IEEE Xplore (2022).

Sanh et al., "DistilBERT, a distilled version of BERT: smaller, faster, cheaper and lighter," arXiv:1910.01108v4 (Mar. 1, 2020).

Schulman et al., "Proximal Policy Optimization Algorithms," arXiv:1707.06347v2 (Aug. 28, 2017).

Sharma et al., "Third-Person Visual Imitation Learning via Decoupled Hierarchical Controller," 33rd Conference on Neural Information Processing Systems (NeurIPS 2019), Vancouver, Canada.

Sieb et al., "Graph-Structured Visual Imitation," 3rd Conference on Robot Learning (CoRL 2019), Osaka, Japan. (May 12, 2020).

Smith et al., "AVID: Learning Multi-Stage Tasks via Pixel-Level Translation of Human Videos, "arXiv:1912.04443v3 (Jun. 21, 2020).

Stadie et al., "Third-Person Imitation Learning," arXiv:1703.01703v2 (Sep. 22, 2019).

Touvron et al., "Llama 2: Open Foundation and Fine-Tuned Chat Models," arXiv:2307.09288v2 (Jul. 19, 2023).

Vaswani et al., "Attention Is All You Need," 31st Conference on Neural Information Processing Systems (NIPS 2017), Long Beach, CA, USA. (Jun. 12, 2017).

Wang et al., "Structbert: Incorporating Language Structures Into Pre-Training for Deep Language Understanding,," arXiv:1908.04577v3 (Sep. 27, 2019).

Xiong et al., "Learning by Watching: Physical Imitation of Manipulation Skills from Human Videos," arXiv:2101.07241v2 (Nov. 14, 2021).

Yao et al., "FILIP: Fine-Grained Interactive Language-Image Pre-Training," arXiv:2111.07783v1 (Nov. 9, 2021).

Yin et al., "A Survey on Multimodal Large Language Models," arXiv:2306.13549v2 (Apr. 1, 2024).

Sun et al., "Learning by Watching via Keypoint Extraction and Imitation Learning," Machines 2022, 10, 1049. https://doi.org/10.3390/machines10111049 (Nov. 9, 2022).

Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).

Zhang et al., "MM-LLMs: Recent Advances in MultiModal Large Language Models," arXiv:2401.13601v5 (May 28, 2024).

Zhou et al., "Watch, Try, Learn: Meta-Learning From Demonstrations and Rewards," arXiv:1906.03352v4 (Jan. 30, 2020).

Kim, Moo Jin, et al. "Openvla: An open-source vision-language-action model." arXiv preprint arXiv:2406.09246 (Jun. 13, 2024).

Brohan, Anthony, et al. "Rt-1: Robotics transformer for real-world control at scale." arXiv preprint arXiv:2212.06817 (Dec. 13, 2022).

Zitkovich, Brianna, et al. "Rt-2: Vision-language-action models transfer web knowledge to robotic control." Conference on Robot Learning. PMLR, (Jul. 28, 2023).

Lynch, Corey, et al. "Interactive language: Talking to robots in real time." IEEE Robotics and Automation Letters (Oct. 12, 2023).

Team, Octo Model, et al. "Octo: An open-source generalist robot policy." arXiv preprint arXiv:2405.12213 (May 20, 2024).

Lynch, Corey, Kamelia Aryafar, and Josh Attenberg. "Images don't lie: Transferring deep visual semantic features to large-scale multimodal learning to rank." Proceedings of the 22nd ACM SIGKDD international conference on, knowledge discovery and data mining. (Nov. 20, 2015).

Sermanet, Pierre, et al. "Time-contrastive networks: Self-supervised learning from video." 2018 IEEE international conference on robotics and automation (ICRA). IEEE, (Mar. 20, 2018).

Dwibedi, Debidatta, et al. "Learning actionable representations from visual observations." 2018 IEEE/RSJ international conference on intelligent robots and systems (IROS). IEEE, Feb. 2, 2018).

Lynch, Corey, et al. "Learning latent plans from play." Conference on robot learning. Pmlr, (Dec. 20, 2020).

Pirk, Sören, et al. "Online object representations with contrastive learning." arXiv preprint arXiv:1906.04312 (Jun. 10, 2019).

Gupta, Abhishek, et al. "Relay policy learning: Solving long-horizon tasks via imitation and reinforcement learning." arXiv preprint arXiv:1910.11956 (Oct. 25, 2019).

Lynch, Corey, and Pierre Sermanet. "Language conditioned imitation learning over unstructured data." arXiv preprint arXiv:2005.07648 (Jul. 7, 2020).

Jang, Eric, et al. "Bc-z: Zero-shot task generalization with robotic imitation learning." Conference on Robot Learning. PMLR, (Feb. 4, 2022).

Gupta, Abhishek, et al. "Bootstrapped autonomous practicing via multi-task reinforcement learning." arXiv preprint arXiv:2203.15755 (Mar. 29, 2022).

Heravi, Negin, et al. "Visuomotor control in multi-object scenes using object-aware representations." arXiv preprint arXiv:2205.06333 (May 12, 2022).

Ding, Tianli, et al. "Goalseye: Learning high speed precision table tennis on a physical robot." arXiv preprint arXiv:2210.03662 (Oct. 13, 2022).

Driess, Danny, et al. "Palm-e: An embodied multimodal language model." (Mar. 6, 2023).

Wiedebach, Georg, et al. "Walking on partial footholds including line contacts with the humanoid robot atlas." 2016 IEEE-RAS 16th International Conference on Humanoid Robots (Humanoids). IEEE, 2016.

Griffin, Robert J., et al. "Walking stabilization using step timing and location adjustment on the humanoid robot, atlas." 2017 IEEE/RSJ International Conference on Intelligent Robots and Systems (IROS). IEEE, 2017.

Griffin, Robert J., et al. "Straight-leg walking through underconstrained whole-body control." 2018 IEEE International Conference on Robotics and Automation (ICRA). IEEE, 2018.

Griffin, Robert J., et al. "Capture point trajectories for reduced knee bend using step time optimization." 2017 IEEE-RAS 17th International Conference on Humanoid Robotics (Humanoids). IEEE, 2017.

Griffin, Robert J., et al. "Footstep planning for autonomous walking over rough terrain." 2019 IEEE-RAS 19th international conference on humanoid robots (humanoids). IEEE, 2019.

Garcia, Gabriel, Robert Griffin, and Jerry Pratt. "0-step capturability, motion decomposition and global feedback control of the 3D variable height-inverted pendulum." arXiv preprint arXiv:1912.06078 (2019).

Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.

(56)        References Cited

OTHER PUBLICATIONS

Calvert, Duncan, et al. "A fast, autonomous, bipedal walking behavior over rapid regions." 2022 IEEE-RAS 21st International Conference on Humanoid Robots (Humanoids). IEEE, 2022.

Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).

Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.

Hebi Robotics, "T-Series Actuator," Jan. 29, 2024.

Cheng et al., "Human Posture Estimation Using Voxel Data for "Smart" Airbag Systems: Issues and Framework," IEEE, p. 84-89 (2004).

Droeschel et al., "Learning to Interpret Pointing Gestures with a Time-of-Flight Camera," IEEE, p. 481-488 (2011).

Frohlich et al., "Design and Impementation of a Spherical Joint for Mobile Manipulators," IEEE, p. 251-258 (2016).

Netzev et al., "Many Faced Robot—Design and Manufacturing of a parametric, Modular and Open Source Robot Head," IEEE, p. 342-348 (2019).

Netzev et al., Design and implementation of a spherical joint for mobile manipulators, 2019, IEEE, p. 342-348 (Year. 2019).

Haddadin et al., The "DLR crash report": Towards a standard crash-testing protocol for robot safety—Part II: Discussions, 2009, IEEE, p. 280-287 (Year: 2009).

Yaghoubi et al., Region-Based CNNs for Pedestrian Gender Recognition in Visual Surveillance Environments, 2019, IEEE, p. 1-5 (Year: 2019).

Pateromichelakis et al., Head-eyes system and gaze analysis of the humanoid robot Romeo, 2014, IEEE, p. 1374-131379 (Year: 2014).

Mokhtari et al., Taban:A Retro-Projected Social Robotic—Head for Human-Robot Interaction, 2019, IEEE, p. 46-51 (Year. 2019)

* cited by examiner 1.2.8

Figures 4, 5:
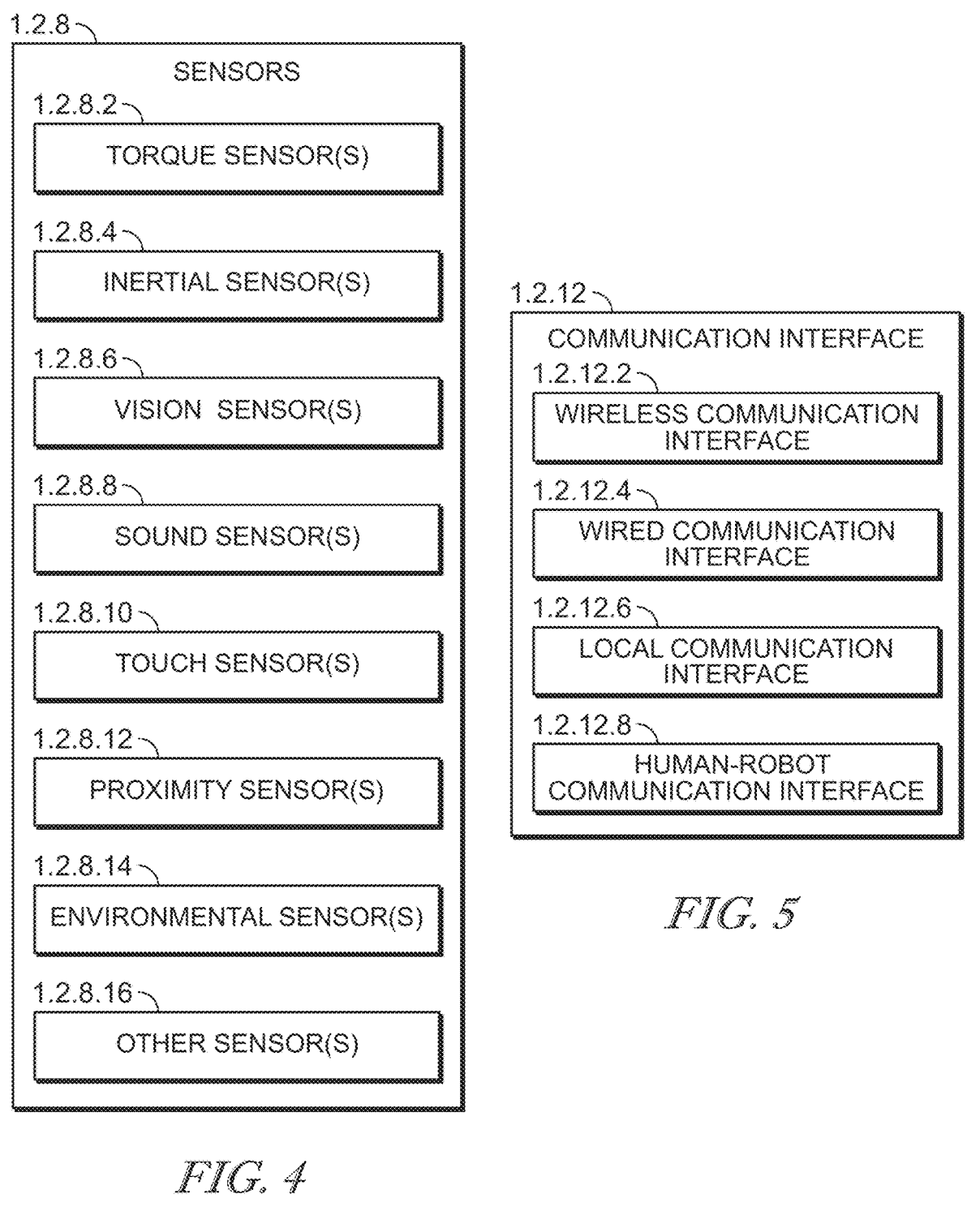

SENSORS

1.2.8.2

TORQUE SENSOR(S)

1.2.8.4

INERTIAL SENSOR(S)

1.2.8.6

VISION SENSOR(S)

1.2.8.8

SOUND SENSOR(S)

1.2.8.10

TOUCH SENSOR(S)

1.2.8.12

PROXIMITY SENSOR(S)

1.2.8.14

ENVIRONMENTAL SENSOR(S)

1.2.8.16

OTHER SENSOR(S)

COMMUNICATION INTERFACE

1.2.12.2

WIRELESS COMMUNICATION INTERFACE 1.2.12.4

WIRED COMMUNICATION INTERFACE 1.2.12.6

LOCAL COMMUNICATION INTERFACE 1.2.12.8

HUMAN-ROBOT COMMUNICATION INTERFACE

MOVEMENT CONTROLLER

1320

COORDINATION ENGINE

1356

BODY COORDINATION PLANNER

1360

FOOT PLACEMENT PLANNER

1370

NAVIGATION ENGINE

1344

COMMUNICATION MODULE

1346

DATA STORAGE

1348

OTHER

1350

BEHAVIOR MANAGER

1364

MODEL PREDICTIVE CONTROL ENGINE

1390

MODE MANAGER

1352

AUTONOMY SELECTOR

1414

COMMUNICATION MODULE

1416

DATA STORAGE

1418

OTHER

SYSTEM AND METHOD FOR EFFICIENT CONTROL OF A HUMANOID ROBOT

CROSS-REFERENCE TO RELATED APPLICATIONS

This application claims the benefit of and priority to U.S. Provisional Patent Application No. 63/691,599, filed on Sep. 6, 2024, which is expressly incorporated by reference herein in its entirety.

TECHNICAL FIELD

The present disclosure relates generally to the field of robotics and, more specifically, to systems and methods for the efficient whole-body control of humanoid robots.

BACKGROUND

Humanoid robots are complex mechatronic systems designed to operate in human-centric environments. Their anthropomorphic design, characterized by a bipedal base, a torso, arms, and a head, allows them to navigate spaces and use tools originally intended for humans. However, this complexity presents significant control challenges, primarily due to the high number of degrees of freedom (DoF) and the inherent instability of bipedal locomotion.

Effective control of such systems is typically achieved through a methodology known as Whole-Body Control (WBC). WBC aims to coordinate the motion of all the robot's joints simultaneously to achieve desired tasks while adhering to various physical and environmental constraints. A central component of WBC involves solving two fundamental and computationally intensive problems: inverse kinematics (IK) and inverse dynamics (ID). Inverse kinematics is the process of determining the set of joint angles and velocities required to place an end-effector (such as a hand or foot) at a specific target position and orientation in space. Following this, inverse dynamics calculates the joint torques necessary to produce the desired accelerations and execute the planned motion.

Conventional WBC systems often struggle to solve these problems efficiently and safely in real time. Therefore, there is a need in the art for an improved control framework that can more efficiently integrate task-space objectives with critical safety-related limitations. A solution is required that can formulate the whole-body control problem in a manner that allows for the simultaneous satisfaction of multiple objectives, including task execution, safety, and pose regularization.

SUMMARY

The presently disclosed subject matter is directed to a method for controlling a humanoid robot. Particularly, the method comprises identifying a task for the humanoid robot to perform. The method includes establishing a safety-related limit for the humanoid robot. The method includes constructing a phantom inverse kinematics task that is mathematically derived from the identified task, wherein the phantom inverse kinematics task is configured to regularize a pose of the humanoid robot. The method includes formulating a combined inverse kinematics problem that incorporates: (i) the task, (ii) the phantom inverse kinematics task, and (iii) the safety-related limit. The method includes solving the inverse kinematics problem to generate target joint parameters that both: (i) satisfy the task, and (ii) are within the established safety-related limit. The method includes providing the target joint parameters to one or more actuators to effect a physical movement of the humanoid robot.

The presently disclosed subject matter is directed to a method for whole body control of a humanoid robot. Particularly, the method comprises obtaining a set of responsibilities based upon a natural language input from a human user. The method includes associating the set of responsibilities with a stack of weighted objectives. The method includes generating a problem to determine motor torques that minimize costs associated with the stack of weighted objectives. The method includes using a first inverse kinematics solver to derive a derived phantom pose. The method includes generating a revised problem that incorporates the derived phantom pose as an additional cost within the problem, thereby regularizing the robot's configuration while satisfying the weighted objectives. The method includes solving the revised problem using a second inverse kinematics solver, and wherein the first inverse kinematics solver is different than the first inverse kinematics solver. The method includes commanding a plurality of actuators based on the solution obtained from the revised problem.

The presently disclosed subject matter is directed to a method for whole body control of a humanoid robot. Particularly, the method comprises identifying an existing motion task defined by a task Jacobian and a set point. The method includes deriving a corresponding phantom motion task based upon the set point and the task Jacobian. The method includes identifying a contact point between an end effector of the humanoid robot and an environment, the contact point is represented as a holonomic constraint. The method includes deriving a corresponding phantom contact task that represents the holonomic constraint as a soft constraint. The method includes solving a single quadratic problem that includes both the phantom motion task and the phantom contact task to determine a target velocity. The method includes utilizing the target velocity to regularize a final set of control instructions sent to actuators of the humanoid robot.

The presently disclosed subject matter is directed to a method for controlling a humanoid robot. Particularly, the method comprises receiving, by a whole body controller, a set of tasks, wherein the set of tasks includes at least one of a posture task or a motion task. The method includes formulating, by the whole body controller, an optimization problem as a quadratic program (QP) to determine motor torques for a plurality of actuators of the humanoid robot, the QP having decision variables that include at least joint torques and joint accelerations. The method includes defining one or more costs for the QP as a set of stacked weighted objectives, wherein objectives with greater weights are prioritized over objectives with lesser weights. The method includes accounting for one or more equality constraints comprising equations of motion and one or more inequality constraints comprising torque limits and friction cones. The method includes solving the QP to generate the motor torques that satisfy the set of tasks by minimizing the one or more costs subject to the one or more equality constraints and the one or more inequality constraints.

The presently disclosed subject matter is directed to a system for ensuring operational safety of a humanoid robot. Particularly, the system comprises a processor and a memory storing instructions that, when executed by the processor, cause a whole body controller to identify an existing motion task defined in a task space of the humanoid robot. The instructions cause the whole body controller to establish a safety-related limit for the humanoid robot. The instructions cause the whole body controller to construct a paired phantom inverse kinematics task corresponding to the existing motion task. The instructions cause the whole body controller to construct a kinematic control barrier function (CBF) corresponding to the safety-related limit. The instructions cause the whole body controller to formulate a combined inverse kinematics problem that incorporates the existing motion task, the paired phantom inverse kinematics task, and the kinematic CBF. The instructions cause the whole body controller to solve the combined inverse kinematics problem to generate target joint parameters that cause the humanoid robot to perform the existing motion task in compliance with the safety-related limit.

The presently disclosed subject matter is directed to a computing architecture for a humanoid robot. Particularly, the computing architecture comprises a movement controller configured to receive a long-horizon goal and decompose the long-horizon goal into a strategic sequence of executable subtasks. The computing architecture includes a behavior manager configured to receive the sequence of executable subtasks and engage a model predictive control (MPC) engine to generate an optimal task-space trajectory for a center of mass of the humanoid robot and a sequence of footstep placements. The computing architecture includes a whole body controller configured to receive the optimal task-space trajectory and compute, using inverse kinematics, a set of joint torques required to actuate a plurality of limbs of the humanoid robot to realize the optimal task-space trajectory.

The presently disclosed subject matter is directed to a method for adaptive learning on a humanoid robot. Particularly, the method comprises storing, in a local AI data storage on the humanoid robot, a plurality of AI models and a plurality of learned behaviors. The method includes selecting, by a model selector, a first AI model from the plurality of AI models based on a received task, a cost to perform the task, and a current health status of the humanoid robot. The method includes generating, by executing the first AI model, an action command for the humanoid robot. The method includes receiving, by a local training sub-system, sensor data reflecting an outcome of executing the action command. The method includes refining, by the local training sub-system, the first AI model based on the sensor data, wherein the local training sub-system comprises a simulation engine configured to execute the first AI model in a virtualized environment and a learning engine configured to update the first AI model.

The presently disclosed subject matter is directed to a system for managing memory on a humanoid robot. Particularly, the system comprises a processor and a memory storing instructions for a movement controller that, when executed by the processor, cause the movement controller to generate, using a navigation engine, navigational data by mapping an environment. The instructions cause the movement controller to store the navigational data in a long-term memory data store, wherein the long-term memory data store comprises maps from a plurality of different humanoid robots. The instructions cause the movement controller to generate, using a body coordination planner, position data comprising a sequence of positions of the humanoid robot over a predefined period of time. The instructions cause the movement controller to store the position data in a separate short-term memory data store. The instructions cause the movement controller to provide a selectable amount of data from the short-term memory data store and the long-term memory data store to an AI system to plan a subsequent task, thereby limiting the data required for processing by the AI system.

In some embodiments, the combined inverse kinematics problem is formulated as a quadratic program (QP) where decision variables consist of generalized velocities, joint torques, joint accelerations, and constraint wrenches. Solving this problem involves minimizing a cost associated with a stack of weighted objectives—such as a posture task, motion task, manipulation task, or a desired constraint wrench—which can incorporate a phantom inverse kinematics task. This phantom task may be a phantom motion task, paired with an existing motion task to re-utilize its Jacobian and set point in forming a corresponding cost, or a phantom contact task, paired with an existing contact task to represent a soft constraint as a linear least squares task. The phantom task is evaluated at a paired skeleton math pose whose configuration is driven by a differential inverse kinematics solver, which solves the combined problem for the present instance in time without a predictive control horizon; the solution can generate a phantom pose utilized as an additional cost in a subsequent optimization. The QP formulation also incorporates equality and inequality constraints, where the latter include safety-related limits like a motor torque limit, a joint position limit, or a friction cone. A key safety-related limit is the kinematic control barrier function (CBF), which defines a safe set for the robot's system state and can be satisfied as an inequality constraint to enforce limits like joint positions. This entire process may be performed by a whole-body controller that resolves competing tasks on centroidal motion using full system dynamics, operating within a larger system that can include a foot placement planner, a navigation engine using Simultaneous Localization and Mapping (SLAM), a model predictive control (MPC) engine using a linear inverted pendulum model, and a data augmentation engine to enhance training data for a learning engine.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 4 is a block diagram of sensors for the humanoid robot of FIGS. 1-3B;

FIG. 5 is a block diagram of a communication interface for the humanoid robot of FIGS. 1-3B;

DETAILED DESCRIPTION

Figure 1:
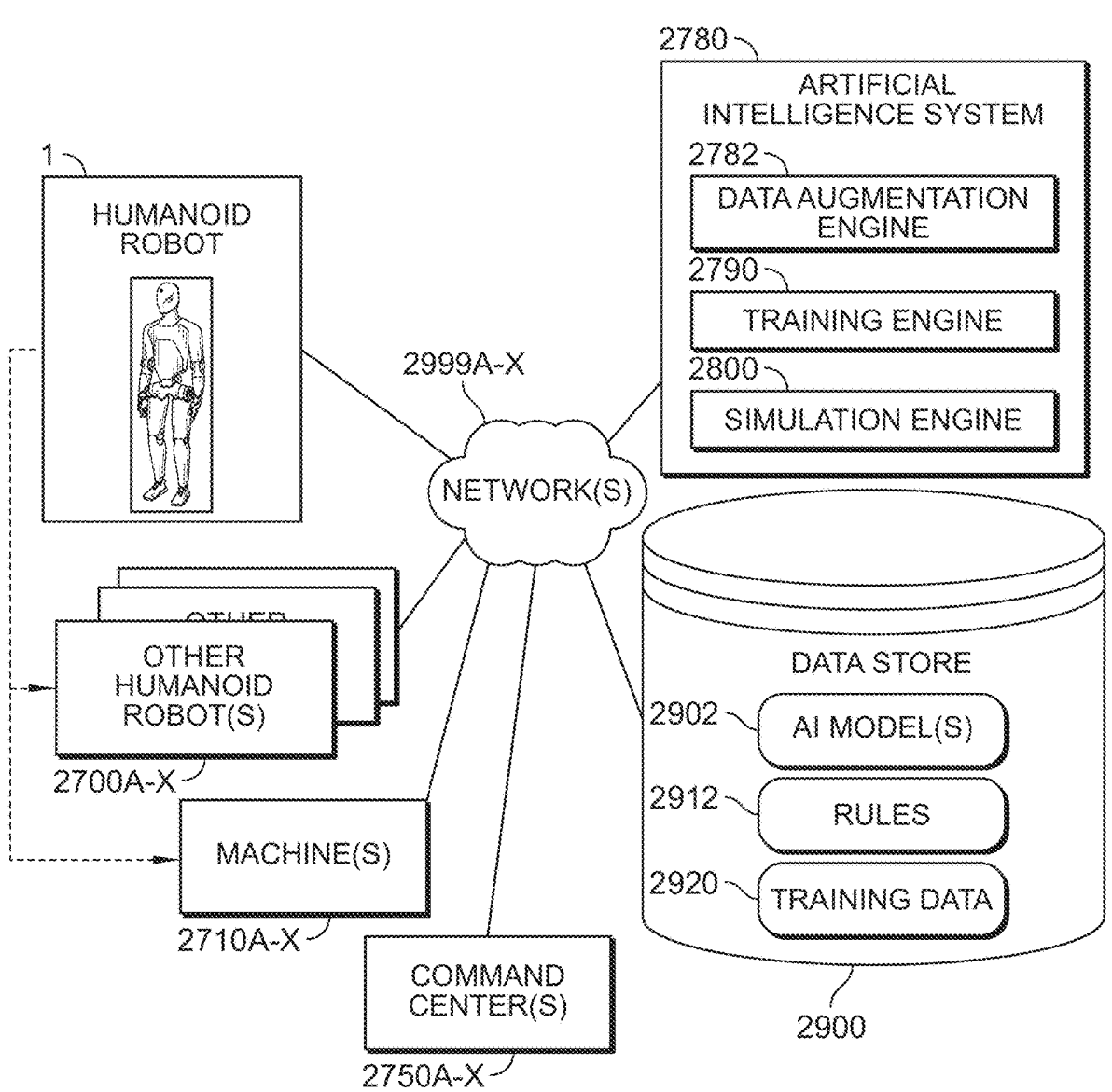
FIG. 1 is a diagram illustrating an environment and a network in which one or more humanoid robots of FIG. 1 may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

The presently disclosed technology is directed at a specific, practical application in the field of robotics and provides a tangible improvement to the functioning of humanoid robot control systems. The control of a humanoid robot presents a concrete technical problem rooted in physical mechanics: the need to coordinate a high-degree-of-freedom mechanical system to perform physical tasks in a dynamic, unpredictable environment. Conventional whole-body controllers struggle because they must solve the computationally intensive problems of inverse kinematics and inverse dynamics in real time-a task whose complexity, involving dozens of simultaneous variables and constraints, is well beyond the capacity for mental calculation. This challenge is magnified when attempting to simultaneously satisfy multiple, often competing, objectives such as task goals, physical constraints, and crucial safety limits. The disclosed methods address these technological shortcomings not with an abstract idea, but with a specific, structural improvement to the robot's control architecture. This improvement yields a direct and measurable enhancement to the machine's operation, resulting in a humanoid robot that is more computationally efficient, physically safer, and more capable of performing complex real work.

The disclosed method is more efficient over conventional systems because it integrates multiple, distinct technical elements that are often handled separately and less effectively in conventional systems into a single, combined inverse kinematics problem that a more efficient system can handle. The disclosed method also does not preclude all other uses of quadratic program solvers, but rather is focused on a specific, inventive application that is directly tried to humanoid robots. Finally, by generating control instructions that inherently and simultaneously balance task execution with safety and stability, the method enables the robot to perform physical actions faster, consume less computational power which extends operational battery life, and operate more safely and predictably around humans and obstacles.

This constitutes a direct and significant improvement to the functionality, reliability, and technical capabilities of the humanoid robot as a machine.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface ($P_G$) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
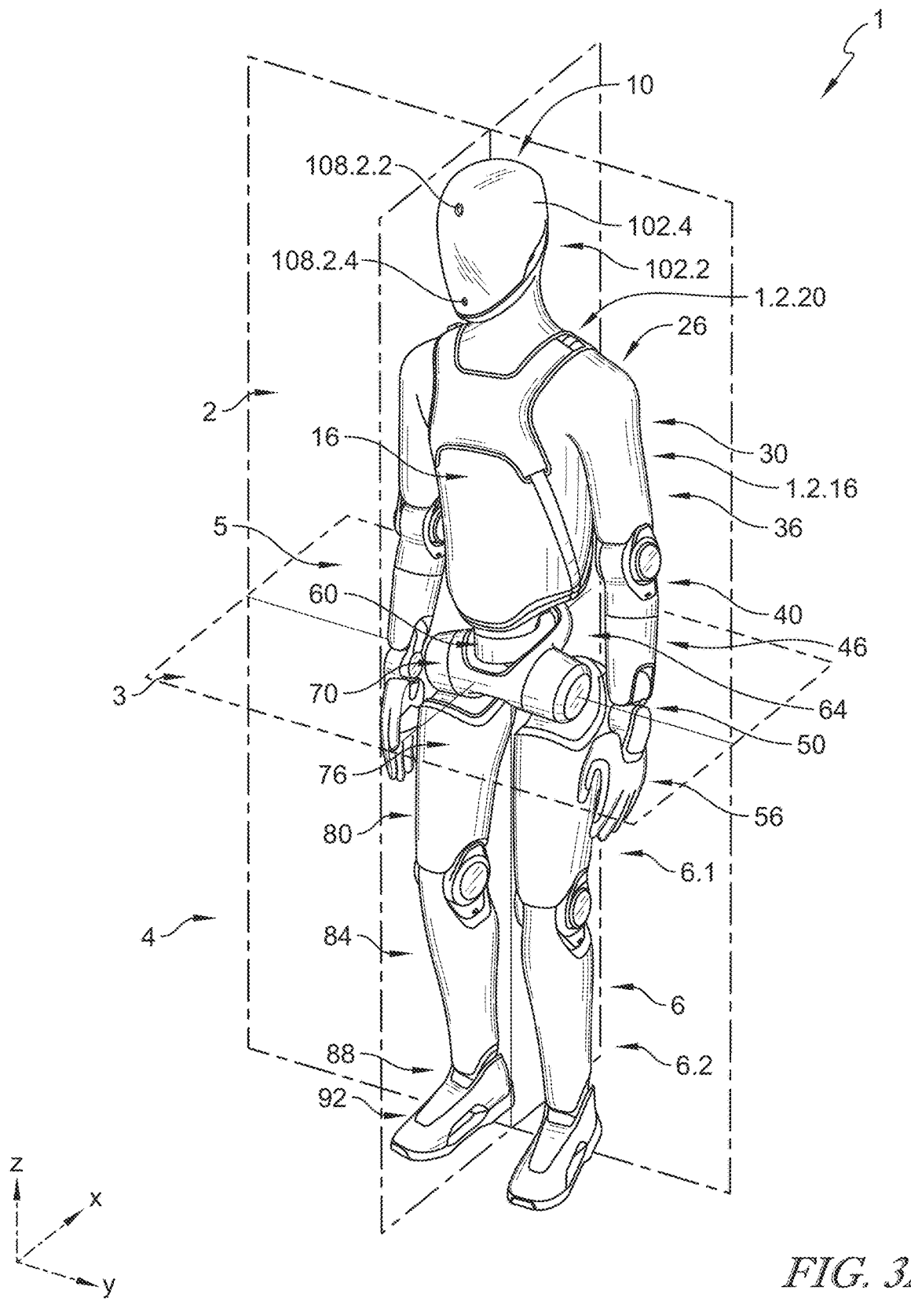
FIG. 3A is a perspective view of a humanoid robot of FIGS. 1-2.
Figure 3B:
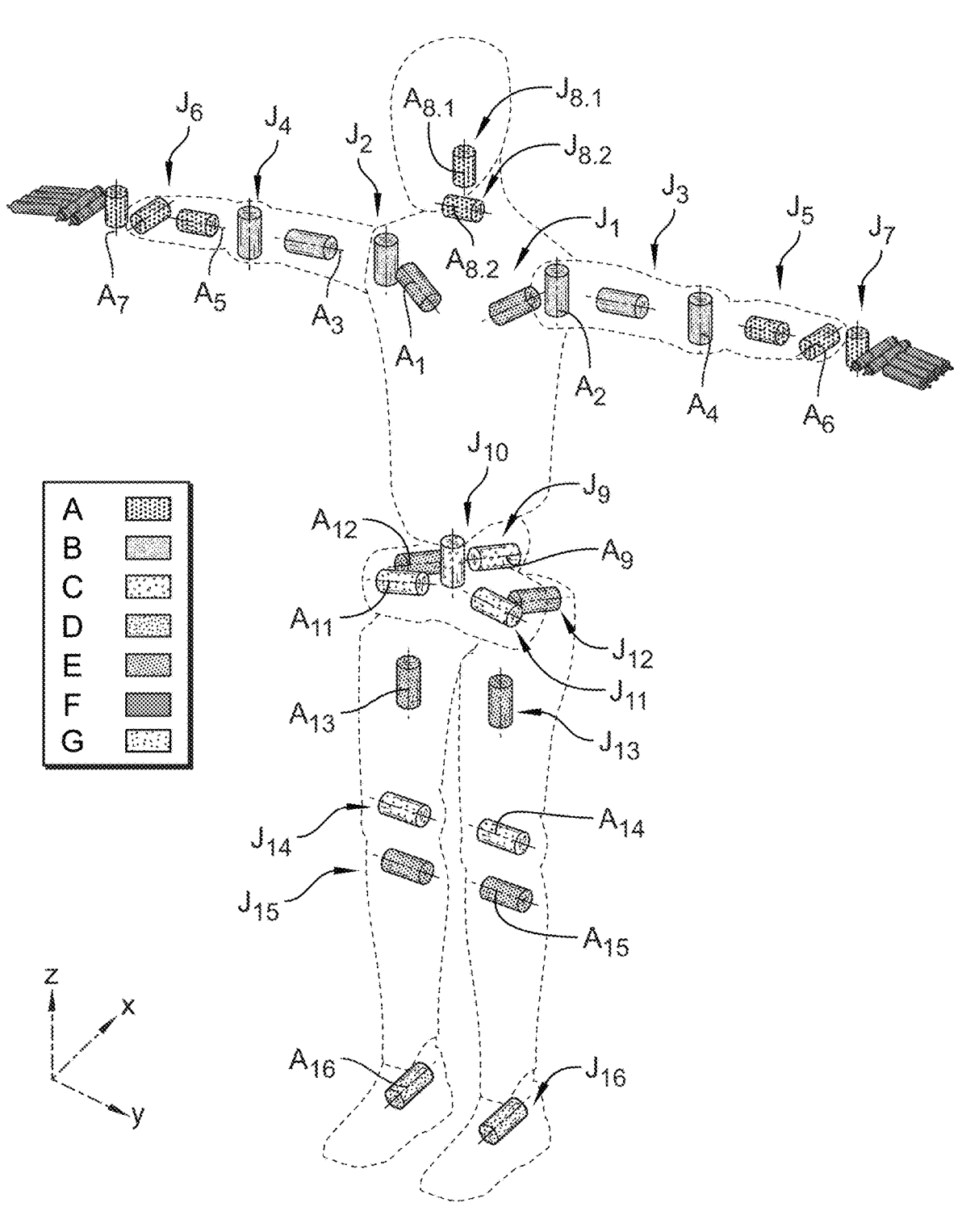
FIG. 3B is a diagram illustrating actuators contained within the humanoid robot of FIGS. 1-3A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii)

contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes An of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion.

Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
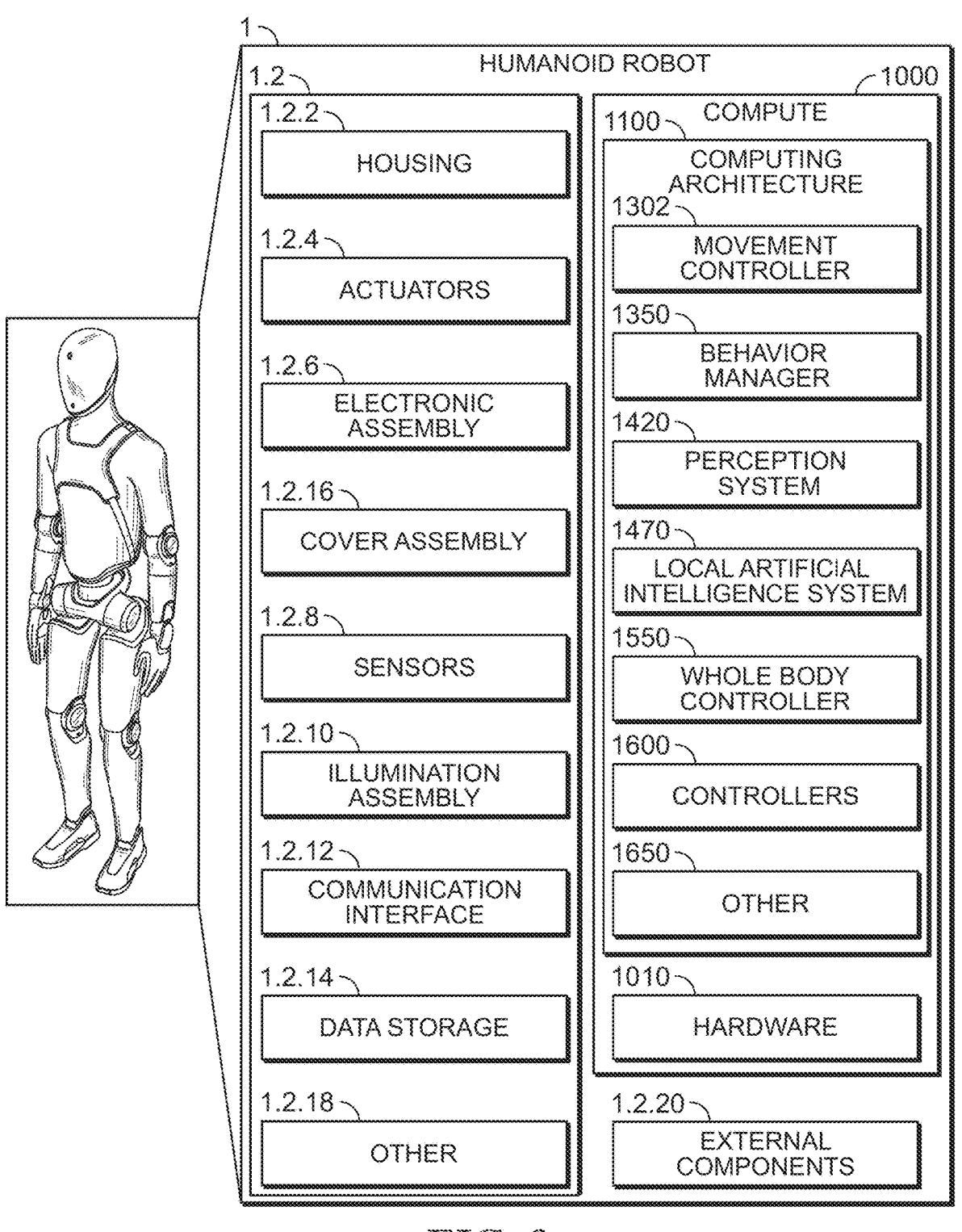
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as checks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Variations of this design may include the addition of a third actuator to provide roll motion, which would further increase the range of movement of the head 10.1 to three degrees of freedom (3-DoF) and could enable more expressive head gestures, such as tilting the head sideways to convey curiosity or empathy. Alternatively, for specialized applications, the actuators (J8.1) and/or (J8.2) may be replaced with compact linear actuators or parallel-link mechanisms.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

ii. Kinematics

As illustrated in, e.g., FIGS. 3A and 3B, an upper portion of the torso 16 is designed to receive and secure two arm actuators (J1) 190, wherein each arm assembly 5 extends from its respective arm actuator (J1) 190 and comprises a series of actuators that are arranged to provide extensive mobility and dexterity. Each arm actuator (J1) 190 is engineered to provide the principal rotational movement for the entire respective arm assembly 5. Each arm actuator (J1) 190 may utilize a motor, a gear reduction system, and sensors or encoders that are similar to other actuators in the robot 1, but potentially with a larger motor and a different gear ratio that is specifically optimized for high-torque shoulder movements.

The rotational axis AI of the arm actuator (J1) 190 is oriented at a rearward angle ($\alpha$) with respect to a vertical or coronal plane $P_C$. This angle $\alpha$ is intentionally selected such that the rotational axis $A_1$ is neither orthogonal nor parallel to the other arm axes ($A_2$-$A_7$) and $\alpha$ is chosen from a range of between 1 and 45 degrees, with a preferred range between 10 and 20 degrees. This specific rearward angle strategically positions a primary kinematic singularity of the arm 5 in the illustrative embodiment of robot 1 at a location that is away from an intended primary operational workspace of the robot 1. This configuration is beneficial because it places that singularity of the robot's arm in a location that is outside of normal use for the tasks that the robot 1 is designed to perform. For example, when the robot 1 holds an object with a narrow grip, it is significantly less likely to encounter this performance-degrading singularity.

Generally, an upper portion of the arm assembly 5 includes three actuators (shoulder actuator J2, upper arm twist actuator J3, elbow actuator J4), while a lower portion of said arm assembly 5 includes three actuators (lower arm twist actuator J5, wrist flex actuator J6, wrist pivot actuator J7). The rotational axes $A_2$, $A_4$ of shoulder actuator J2 and elbow actuator J4, respectively, are arranged such that they are orthogonal to: (i) the rotational axis of $A_3$ of upper arm twist actuator J3. In addition, the rotational axis $A_3$ is collinear with the rotational axis As of lower arm twist actuator J5 when the arm is fully extended. The rotational axis $A_4$ of elbow actuator J4 is oriented orthogonal to the collinear rotational axes $A_3$ and As. Additionally, the axis $A_4$ is offset rearward along the X-axis from a common cord that is defined by the alignment of $A_3$ and $A_5$. This rearward placement of the elbow axis $A_4$ increases its range of motion. The three actuators (J5, J6, J7) situated in the lower portion of the arm are arranged with their respective axes (As, $A_6$, and $A_7$) mutually orthogonal to one another, which provides three degrees of freedom and enables complex orientation of the lower arm and the hand 56. This arrangement allows for control of roll via lower arm twist actuator (J5) 468, pitch via wrist flex actuator (J6) 484, and yaw via wrist pivot actuator (J7) 520, thereby governing the final position of the hand 56. In the wrist 50, the rotational axis As of lower arm twist actuator J5 is positioned orthogonal to the rotational axis $A_7$ of the wrist pivot actuator J7. The elbow axis $A_4$ and the wrist pivot axis $A_7$ are parallel to one another in the extended state but are not aligned within the same ZY-plane.

The central portion of the robot 1 includes the torso lean actuator J9, the torso twist actuator J10, the hip flex actuators J11, and hip roll actuators J12. The torso lean actuator (J9) 680 is positioned in the pelvis 64 and is coupled to the spine 60, while a torso twist actuator (J10) 620 is located in the waist of the robot 1 and is coupled to the spine 60. These two actuators, J9 and J10, are positioned to provide two degrees of freedom for the torso (i.e., torso twist (yaw) and torso lean (roll)) and are centered along the sagittal plane $P_S$, enabling capabilities such as allowing the robot 1 to twist its body to pick up an item that is positioned at 90 degrees to its side and to lean over an obstacle to complete another task. Their respective axes are arranged such that axis $A_9$ (torso lean) is angled downward such that an angle ($\beta$) is formed with respect to the transverse plane ($P_T$) at an angle of between 1 and 30 degrees, preferably 8-16 degrees, while axis $A_{10}$ (torso twist) is parallel with the coronal plane $P_C$ and perpendicular to the transverse plane ($P_T$).

The disclosed robot 1 lacks a dedicated torso pitch actuator that would allow the robot 1 to bend forward (i.e., in a ZX-plane from the neutral state) at the robot's belly. The elimination of this actuator can increase the internal volume of the torso 16 by over 300% (e.g., from approximately 7 liters to approximately 20 liters). This expanded volume allows for the inclusion of a relatively larger battery pack and relatively larger volume for compute. This lack of a torso pitch actuator would be a significant sacrifice, but for the ability to generally move this functionality into the robot's hips, specifically hip flex actuators (J11) 720. By rotating both hip flex actuators (J11) 720 in concert, the robot 1 can effectively bend its entire upper body forward from the hips. While the functionality of hip flex actuators (J11) 720 does not fully replace the inclusion of a specific torso pitch actuator because it alters the location from where the robot 1 can bend forward, the designer of the disclosed robot 1 made this trade-off in order to gain the above-described benefits. It should be understood, however, that said robot 1 could be modified to include a torso pitch actuator to add this additional functionality if needed.

As illustrated in FIGS. 3A and 3B, the hip flex actuators (J11) 720 are coupled to the left and right sides of the pelvis 64. Each rotational axis $A_{11}$ of hip flex actuators (J11) 720 is positioned at a respective downward angle such that an angle ($\gamma$) is formed with respect to the transverse plane ($P_T$) of between 1 and 30 degrees, preferably 8-16 degrees, a configuration to provide a pitch-like motion (e.g., extension and flexion, front kick or a torso 16 forward lean motion). Each axis An is also offset from axes Ajo and $A_9$ along the Z-axis, which helps position the leg directly beneath a frontal extent of the torso 16. In an unconventional arrangement, the hip flex actuators (J11) 720 are directly coupled to the pelvis 64 and are positioned closer to the torso lean actuator (J9) than are any other leg actuators. This high placement (e.g., relative to the leg assemblies 6) within the kinematic chain increases the torque requirements for the hip flex actuators (J11) 720 actuators, which are sized accordingly with approximately twice the torque capacity of the hip roll actuators (J12) 768 and leg twist actuators (J13) 782.

The hip roll actuators (J12) 768 can each independently provide roll-like movement (e.g., abduction and adduction, hip pivot, sideways kick) about rotational axis $A_{12}$ for the portions of the respective leg assemblies 6 that are moved about the hip roll actuators (J12) 768. In the illustrative embodiment of robot 1, the hip roll actuators (J12) 768 are each coupled to a respective hip flex actuator (J11) 720, rather than being coupled directly to the pelvis 64. This arrangement allows the hip roll axis $A_{12}$ to be angled rearward and downward relative such that an angle ($\delta$) is formed with respect to the transverse plane ($P_T$) of between 1 and 45 degrees, preferably 10-20 degrees. Hip roll axis $A_{12}$ is neither parallel nor orthogonal to any other of the actuators J13, J14, J15, J16, each described in further detail below. This specific configuration provides a greater range of motion for actions such as performing deep squats and rising from the ground, which further compensates for the absence of a dedicated spine pitch actuator.

A left and right leg twist actuator (J13) 782 is positioned near actuator (J12) 768 within the hip housing and is coupled to the lower thigh 80. Its rotational axis, $A_{13}$, is parallel with the torso twist axis $A_{10}$. Each leg twist actuator (J13) 782 can each independently provide a yaw movement about rotational axis $A_{13}$ for lower portions of the respective leg assembly 6 that are moved about the leg twist actuator (J13) 782. Each leg twist actuator (J13) 782 is not directly coupled to the pelvis 64, and each is positioned below all of the other hip and spine actuators (J9-J12). This is different than conventional robots and is potentially less desirable due to the fact that it increases the weight in the lower leg, which increases the torque requirements of the other actuators contained in the hip. However, in this configuration, as described above, the hip flex actuator (J11) 720 has been configured with a greater torque to address this issue. This particular design may also require any hip housing to be split into two separate components, which may add a degree of manufacturing complexity and cost.

Each leg assembly 6 of the robot 1 includes a knee actuator (J14) 820 with a rotational axis $A_{14}$ which is housed in the lower thigh 80. Unlike conventional designs that often utilize linear actuators or linkages for knee joints, knee actuator (J14) 820 is a rotary actuator that is directly coupled to housings of the lower thigh 80 and the shin 84 and provides a pitch movement about rotational axis $A_{14}$.

Each leg assembly 6 of the robot 1 includes a foot assembly which includes a foot flex actuator (J15) 860 with a rotational axis Ais, which is housed in the shin 84 and utilizes a rotary actuator and an associated linkage to provide a pitch movement (e.g., flexion and extension) for the foot 92 which is not about the rotational axis $A_{15}$. Each foot 92 further includes a foot roll actuator (J16) 900 with a rotational axis $A_{16}$, which is housed within the talus 88 and provides a roll movement for respective portions of the foot 92 that are moved about the foot roll actuator (J16) 900. Placing the roll actuator (J16) 900 in the foot is an uncommon design solution that tends to increase the torque requirements on other leg actuators (J11, J12, J14). However, the housing of actuator (J16) 900 is advantageously designed to couple directly to the output of actuator (J15) 860, a configuration that reduces the total number of parts and minimizes potential failure modes.

The humanoid robot 1 may further include head and neck actuators to complete its human-like form. For example, a head twist actuator (J8.1) 120 with a rotational axis $A_{8.1}$ and a head nod actuator (J8.2) 140 with a rotational axis $A_{8.2}$ may be included to provide two degrees of freedom (e.g., yaw and pitch, respectively) to orient sensors, cameras, or displays that are housed within the head 10.1. Although the head 10.1 and neck are not intended to manipulate objects, the head 10.1 completes the human-like form and may contain components such as cameras, displays, or other user interfaces. The head twist actuator (J8.1) 120 and the head nod actuator (J8.2) 140 may be used to direct the field of view of one or more cameras or sensors that are contained within the head 10.1 and may cooperate with each other, but they are not generally linked to other actuators.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined.

Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the below table

TABLE 1

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts.

A substantial majority of the actuators 1.2.4 (e.g., about twenty-eight of the forty-two actuators or about 66.7% of the actuators) in the illustrative embodiment robot 1 are not connected to a drive linkage; instead, they directly drive the associated part of the robot 1. Conversely, in the illustrative embodiment robot 1, fourteen of the forty-two actuators 1.2.4, or about 33.3% (but more than 10%, and preferably more than 25%), of the rotary actuators are coupled to a drive linkage. Drive linkages are coupled to an aggregate total of twelve rotary actuators contained within both hands 56 and to the foot flex actuators (J15) in each shin 84. These drive linkages allow: (i) the fingers and thumb to be under-actuated, meaning they retain the ability to flex, curl, or rotate around an object while eliminating the need for an actuator to control each joint or degree of freedom, and (ii) the foot 92 to pivot around an axis that is located well forward (e.g., more than 10% of the overall length of the foot) of the center of the drive linkage.

The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

ii. External Cover Assembly

The illustrative embodiment robot 1 includes various components (e.g., assemblies) with housings 1.2.2 (e.g., to form an exoskeleton) that are designed to protect the operational systems of the robot 1, such as actuators 1.2.4 and electronics assembly 1.2.6, provide structural support, and give form to the robot 1. Said housings 1.2.2 can be comprised of hard or rigid casings that may include internal mounting features designed to support systems in specific locations, structural features engineered to withstand operational loads, and internal and/or external features that allow for interoperation between adjacent components and/or are formed to resemble human features. Some housings 1.2.2 additionally include one or more detachable shells that may overlay a casing to allow access to internal assemblies or to complete the form of the component.

The requirements of the housings 1.2.2 can vary in shape and form based on the individual structural or material requirements for each specific component. While it may be desirable to utilize a particular material for all housings 1.2.2 to create a consistent exterior appearance, fabrication may be complicated by specific structural or operational needs at different locations. It may not be necessary to utilize the same materials in different housings 1.2.2 that experience different load requirements. Various materials may be preferred for a specific housing 1.2.2 based on properties such as strength, toughness, elasticity, weight, and conductivity. Similarly, the complexity of some housing 1.2.2 designs may be better suited for one type of manufacturing process, such as machining, die casting, injection molding, or composite fabrication, over another. Because there is a desire or need to use different materials within different regions and/or use materials that do not have a consistent exterior appearance, the illustrative embodiment robot 1 includes exterior coverings of the exterior covering assembly 1.2.16 that are designed to at least partially hide the housings 1.2.2 under a textile exterior layer that can be easily swapped if damaged, serve to protect internal components from dust and debris, are designed to fit the form of the robot 1 without substantial wrinkling, and/or allow for venting or address thermal considerations at specified locations.

The exterior coverings may have a multi-layered assembly, which may include: (i) an energy-absorbing material that is coupled to the coupling layer, (ii) a coupling layer (e.g., plastic or polymer based), wherein the coupling layer facilitates attachment to, or attachment at, a housing 1.2.2, and/or (iii) an exterior coverings material (e.g., a textile). Alternatively, the multi-layered assembly may omit the coupling layer, the energy-absorbing material, and/or exterior covering material. In each case, the movement of the nearby joint may cause one housing 1.2.2 to impact or crush the energy absorbing layer instead of another housing 1.2.2, thereby mitigating or eliminating structural stress or load on either housing 1.2.2 and/or the respective actuator 1.2.4. Additionally, the energy attenuation members help to reduce pinch points, and/or allow for a more human-like appearance.

1. Energy Attenuation Assembly

The energy attenuation assembly may be composed of a plurality of integrated or removable energy attenuation members, such as pads, panels, or bumpers, that are attached to housings 1.2.2 of the robot 1 and/or are positioned within the external covers. Said energy attenuation members may: (i) be attached directly to a particular exterior side of a housing 1.2.2 (e.g., overlie the housing), (ii) surround an exterior of a housing 1.2.2 and not be directly attached (e.g., friction fit), (iii) be attached to the edges of an opening formed in the housing 1.2.2 (e.g., act as a deformational extent of the housing), and/or (iv) be attached to or retained by the exterior coverings.

The disclosed robot 1 includes a torso energy attenuation member, elbow energy attenuation members, and leg energy attenuation members. Additionally, energy attenuation members may be included at the hip, shin, and/or foot. Some or all energy attenuation members may also be omitted. Energy attenuation members can be configured to enhance or alter the shape of the robot 1 without adding substantial weight and to provide a deformable structure with energy absorption properties to protect underlying components.

The energy attenuation members can be made from a wide variety of materials, including: (i) polymers, such as polyethylene foam (PE Foam), ethylene vinyl acetate (EVA) foam, polyurethane foam (including Memory Foam and Open-cell Polyurethane Foam); (ii) rubber foams; (iii) natural foams; (iv) engineered foams; (v) composite and hybrid materials; (vi) expanded polystyrene (EPS); (vii) expanded polypropylene (EPP); (viii) Koroyd®; (ix) D3O®; (x) Poron® XRD; (xi) thermoplastic elastomers (TPE) or thermoplastic polyurethane (TPU); (xii) any other material known to one of skill in the art that accomplishes the desired energy absorption characteristics; (xiii) any combination of the above. Furthermore, the energy-absorbing material may alternatively or additionally include other structures of said materials, wherein said structures may include lattices and/or repeating units, such as a cube, sphere, cylinder, cone, pyramid, torus, prism, tetrahedron, dodecahedron, octahedron, icosahedron, ellipsoid, paraboloid, cuboid, or hexahedron. It should be understood that the repeating unit or lattice cell may be contained in a specific region or may propagate throughout the entire energy attenuation member. Additionally, the energy attenuation members and/or the assembly may have varying properties, such as thickness, density, C/D ratio, and stiffness. This variation may be arranged in a gradient manner, wherein the energy-absorbing materials transition from softer to firmer layers or regions to provide progressive energy dissipation.

2. Exterior Coverings

The exterior coverings, which can include a neck cover, a torso cover, an upper leg cover, a shin cover, a foot cover, a lower arm cover, and a hand cover, are designed not to interfere with the robot's range of motion, to allow access to underlying components, to potentially add indicators to the external surface, and to improve the robot's overall aesthetic appearance. As shown in the figures, a single exterior covering does not extend over all actuators in the robot 1, and typically does not cover more than five actuators at a time. In other words, the exterior covering does not resemble an oversized jumpsuit with a closure running from, e.g., the robot's pelvis to its head region, nor does it include a hood that extends around a substantial portion of the robot's head. Instead, the exterior covering is strategically and tightly fitted in certain regions and may include different inserts (e.g., a different textile) that are positioned between the moving aspects of joints.

Exterior coverings materials of the exterior covering assembly 1.2.16 can be made from one or more textiles and can be customized or selected to reduce wrinkling and to allow for the twisting or movement of the underlying components without restriction or substantial distortion. For example, the exterior coverings materials may be designed to allow the lower arm to twist and rotate from about −120 degrees to about 180 degrees. Additionally, the exterior coverings materials may be selected to allow for the cooling of components, the viewing of indicator lights, or the operation of buttons through said exterior coverings. This provides a substantial benefit over conventional systems that lack these advanced features. It should be understood that this disclosure contemplates using or including exterior coverings materials that: (i) integrate lights from the robot 1 into said exterior covering, and specifically into a textile itself, (ii) may be translucent or temporarily translucent (e.g., based on time or environment), and/or (iii) can be formed (e.g., woven) in a manner that allows light to be transmitted through the textile.

As such, various types of lights (e.g., fiber optic lighting, led strip lights, led rope lights, micro-led string lights, led neon flex, phosphorescent paint, OLED panels (organic light-emitting diode), laser diode lighting, neon tubing, electroluminescent panels, led edge-lit panels, flexible led sheets, flexible OLED strips, inductive electroluminescent displays, laser fiber cables, quantum dot light-emitting displays, phosphor-coated led strips, laser-activated fluorescent materials, electroluminescent paint, laser-illuminated fiber bunches, phosphor-coated electroluminescent (PCEL) materials, smart RGB led strips, light-up silicone tubing (LED or EL-based), laser wire, or other electroluminescent materials such as EL wire, EL tape, or EL film) that are coupled to the humanoid robot 1 may be visible through the exterior coverings material. The exterior coverings material can include reflective yarn or night-luminous yarn that changes its appearance when light is shining on its surface. In other embodiments, a shiny, reflective, iridescent, matte, or textured polyurethane film can be applied to the surface of the exterior coverings material (e.g., a textile) in certain areas to provide an additional reflective effect or for another purpose, such as displaying a logo, pattern, or labels.

The exterior coverings material can also include features to accommodate the thermal considerations of the robot 1. In various examples, the exterior coverings material can be a custom textile that utilize different weaves in different locations to allow for ventilation in specific areas. Additionally, the exterior coverings material can include textiles or threads that are heat-sensitive and change color with a change in temperature. In summary, the exterior coverings may additionally be made from, include, or specifically omit any one or any combination of the following material types: durable materials, flame-resistant materials, waterproof materials, hazard materials, chemical-resistant materials.

Alternatively or additionally, the exterior covering assembly 1.2.16 may include features such as closures (e.g., a zipper that runs a partial or full length of the exterior covering assembly 1.2.16), attachment points, couplers, self-cleaning nanocoatings, thermoelectric materials, photochromic dyes, or electromagnetic shielding layers, as well as modular, quick-release panels or e-textile technology with conductive fibers woven throughout to create a distributed sensor network that is capable of detecting impacts, monitoring joint angles, or even harvesting energy from movement. The exterior covering assembly 1.2.16 may be designed to include inserts (which may also be textiles or may be other materials) that are positioned strategically between moving joint components to further ensure that pivoting motion is not restricted at the joints of the humanoid robot 1. Different textile materials, patterns, knits, weaves, etc. may be incorporated to facilitate movement in specific regions, thereby enhancing the functional dexterity of the robot 1.

iii. Sensors

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iv. Communication Interfaces

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Arca Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

v. Data Storage

Referring back to FIG. 2, the data storage 1.2.14 may be embodied as any hardware, software, or circuitry for storing, retrieving, and maintaining data for the humanoid robot 1. More particularly, the data storage 1.2.14 may be embodied as any type of device configured for short-term or long-term storage of data. The data storage 1.2.14 may be embodied as memory devices and circuits, solid state drives (SSDs), memory cards, hard disk drives, USB flash drives, or other data storage devices. The data storage 1.2.14 can be embodied as one or more SSDs that expose internal parallelism to components of the humanoid robot 1, allowing the humanoid robot 1, for example, via the compute 1000, to perform storage operations on the data storage 1.2.14 in parallel.

The data storage 1.2.14 may also include memory devices, which may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards, and similar standards, may be referred to as DDR-based standards and communication interfaces of the storage devices that implement such standards may be referred to as DDR-based interfaces.

The memory device is a block addressable memory device, such as those based on NAND or NOR technologies. A memory device may also include a three dimensional crosspoint memory device (e.g., Intel® 3D XPoint® memory), or other byte addressable write-in-place nonvolatile memory devices. In an embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the device itself and/or to a packaged memory product. For data storage 1.2.14, a hierarchical storage architecture may be employed, using faster, smaller caches for frequently accessed data and larger, slower storage for archival or less critical data, optimizing both speed and capacity.

c. Compute

As illustrated in FIG. 2, the compute 1000 may comprise any combination of hardware, software, and electronic circuitry configured to perform various computing functions that enable the humanoid robot 1 to operate in a semi-autonomous or fully-autonomous manner. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferentia, Apple Neural Engine, and Huawei Ascend; and Neuromorphic Neural Network Processing Units such as Intel Loihi or BrainChip Akida), and other processors. For example, the other processors may be embodied as a single or multi-core processor, a micro-controller, or other processor or processing/controlling cir-cuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a move-ment controller 1302, (ii) a behavior manager 1350, (iii) a perception system 1420, (iv) a local AI system 1470, (v) a whole body controller 1550, (vi) one or more controllers 1600, and (vii) other subcomponents 1650.

1. Movement Controller

Figures 6, 7:
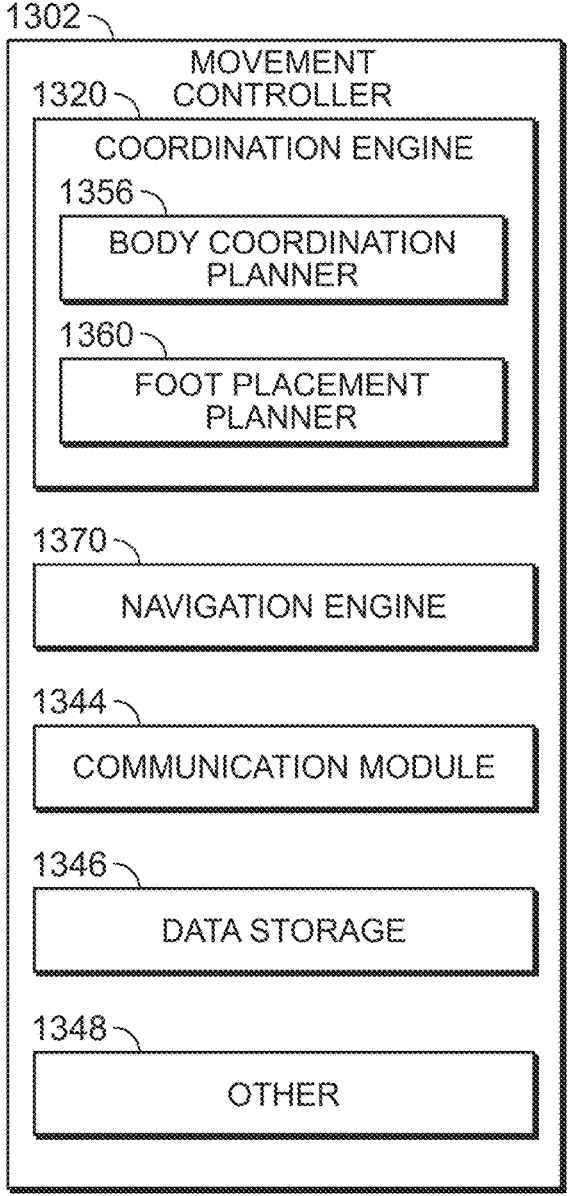
FIG. 6 is a block diagram of a movement controller for the humanoid robot of FIGS. 1-3B.
FIG. 7 is a block diagram of a behavior manager for the humanoid robot of FIGS. 1-3B.

Referring to FIG. 6, the movement controller 1302 may be embodied as any hardware, software, or circuitry to determine a sequence of actions or a path for the humanoid robot 1 to achieve a given goal or complete a given task, in light of a current state, a set of constraints (e.g., the capa-bilities of the robot 1 and the environment and surroundings of the robot 1), and instructions from another sub-compo-nent of the robot 1 or another aspect of the overall archi-tecture 1100. To carry this out, the movement controller 1302 may include a variety of components, such as: (i) a coordination engine 1320, (ii) a navigation engine 1370, (iii) a communication module 1344, (iv) a data storage 1346, and/or (v) other 1348.

The disclosed movement controller 1302 overcomes limi-tations associated with conventional robotic systems by enabling the robot 1 to: (i) coordinate its body using the body coordination planner 1356 and the foot placement planner 1360 based on high-level instructions from the local AI system 1470 and/or a remote AI system 2780, (ii) navigate its environment by generating maps (e.g., using Simultaneous Localization and Mapping, or SLAM, tech-niques) and predicting the future movement of dynamic objects within the environment, and (iii) communicate rel-evant data to other systems within its environment. The movement controller 1302 also enables the robot 1 to adapt in real-time to dynamic environments by continuously moni-toring the execution of its plans and comparing the expected outcomes with actual results. The movement controller 1302 further addresses the technical challenge of efficient resource allocation. By considering the current state of the humanoid robot 1, available energy levels, time constraints, and the relative prioritization of different goals, the move-ment controller 1302 optimizes the allocation of the com-putational and physical resources of the robot 1. Further-more, the movement controller 1302 can address the issue of human-robot collaboration by incorporating models of human behavior and preferences into its decision-making process. This allows the robot 1 to generate plans that are not only efficient from a purely mechanical standpoint but are also intuitive and comfortable for human collaborators.

In an embodiment, the coordination engine 1320 receives task inputs from one or more AI systems 1470, 2780 and provides supplemental information to the whole body con-troller 1550 regarding the state, configuration, and/or posi-tion of the robot 1 within its environment. In particular, the coordination engine 1320 can utilize both the body coordi-nation planner 1356 and the foot placement planner 1360 to control the body placement and foot placement of the humanoid robot 1 based on the inputs from the one or more AI systems 1470, 2780. Specifically, the coordination engine 1320 may decompose or, when a stability constraint is at risk of being violated, override the task inputs from the one or more AI systems 1470, 2780 to ensure efficient control of the humanoid robot 1 within a space. For example, during dynamic movements such as walking, running, or jumping, the coordination engine 1320 generates intermediate targets to ensure the balance, stability, and overall efficiency of the humanoid robot's locomotion. In other embodiments, the coordination engine 1320 and/or most of the movement controller 1302 may be consumed within the one or more AI systems 1470, 2780.

The navigation engine 1370 may be embodied as any combination of hardware, software, and/or circuitry to map the environment and surroundings based on obtained sensor data (and data that may be obtained from external sources such as other humanoid robots 2700A-X, mapping services, weather services, GPS modules, etc.) and to generate one or more paths. The mapping for the environment by the navi-gation engine 1370 may then be provided to the one or more AI systems 1470, 2780 to enable said systems to plan the next move or task of the robot 1.

The data storage 1346 may be configured to store navi-gational data generated by the navigation engine 1370 and/or position data generated by the planners 1356, 1360. This navigational data and/or position data may be then fed back into the one or more $A_1$ systems 1470, 2780 to enable said systems to plan the next move or task. This data may be categorized as short-term memory data and/or long-term memory data. For example, the short-term memory data may include said position data, which comprises the positions of the robot 1 over the last predefined amount of time (e.g., 1 minute or 5 seconds, or anytime between). Meanwhile, the long-term memory data may include the navigational data, which comprises maps of every place any robot 1, 2700A-X has ever visited or been. The ability to selectively provide varying amounts of short-term memory data and/or long-term memory data to the one or more AI systems 1470, 2780 offers an advantage over conventional robotic systems. This selective data provision can limit the data context for a given task, thereby reducing the processing load and conserving computational resources, which is a consideration for a power-constrained mobile robot 1. It should be understood that the movement controller 1302 may be omitted and/or consumed by one or more models (e.g., RL trained models) that are contained within the local AI system 1470.

2. Behavior Manager

Referring to FIG. 7, the behavior manager 1350 may be embodied as any hardware, software, or circuitry for man-aging behaviors or actions of the humanoid robot 1 based on a given goal, sensor data, and the environment and surround-ings of the humanoid robot 1. To accomplish this, the behavior manager 1350 includes: (i) at least one model predictive control engine 1364, (ii) a mode manager 1390, (iii) an autonomy selector 1352, (iv) a communications module 1414, (v) a data storage 1416, and (vi) other modules or components 1418. The disclosed behavior manager 1350 solves several technical issues in the field of robotics. One technical issue solved by the behavior manager 1350 is the integration and coordination of multiple modules within a single robotic system. The behavior manager 1350 also solves the technical issue of ensuring that the behaviors of the robot 1 are executed in the correct order, which prevents conflicts and ensures smooth transitions between different actions or states. For example, the manager 1350 might ensure that a "stand up" behavior is completed before a "walk" behavior is initiated, or that an "object recognition" behavior is performed before an attempt to grasp an object is made.

The model predictive control engine (MPC) 1364 functions to predict future states of the humanoid robot 1 based on its current state and a dynamic model of the robot. This predictive capability is used to make decisions that optimize behavior and performance over a defined future time period, known as a predictive horizon. The MPC engine 1364 may select from one or more predefined or learned actions for the humanoid robot 1 to take in response to various stimuli observed by the humanoid robot 1 (e.g., via sensors 1.2.8) and other factors such as assigned tasks to perform. For example, such MPC engine 1364 may select from or utilize different predefined routines or modes to accomplish path planning, obstacle avoidance, object grasping and manipulation, human-robot interaction, task planning and execution, decision making, coordination with other humanoid robots 2700A-X and machines 2710A-X, and safety and regulatory compliance behaviors. Over time, the MPC engine 1364 may communicate with the local AI system 1470 to enable the MPC engine 1364 to refine its selections based on learning algorithms that identify predefined or learned actions for the humanoid robot 1 based on the given tasks, scenarios, and constraints.

Meanwhile the mode manager 1390 can manage modes of the robot 1. Specifically, the mode manager 1390 is configured to select an appropriate mode or set of modes given a specified task, scenario, or constraint. For example, the mode manager 1390 may select between a power mode, a standby mode, a standing mode, a sitting mode, a movement mode (e.g., running, walking, jumping, hovering, etc.), a falling mode, a learning mode, a diagnostic mode, an emergency mode, etc. Over time, the mode manager 1390 may collaborate with the local AI system 1470 to refine its mode selection based on learning algorithms.

The autonomy selector 1352 may be configured to manage autonomous features of the behavior manager 1350. For example, an operator may, through the autonomy selector 1352, configure a level of autonomy of the humanoid robot 1 (e.g., such that the humanoid robot 1 operates manually, in which the operator may remotely control the operation of the robot 1, semi-autonomously, or fully autonomously). In an embodiment, the operator may, through the autonomy selector 1352, specify certain features to be conducted autonomously and others to, e.g., perform a repetitive task without any form of AI/ML-based behavior or to require some form of manual input for operation.

The communication module 1414 may be embodied as any combination of hardware, software, or circuitry to enable components of the behavior manager 1350 to communicate with one another and with other components of the humanoid robot 1 (such as of the compute 1000). The data storage 1416 may be any data storage device or partition on a data storage device for short-term or long-term storage of behavior controller data (e.g., event logs, movement data, training data, navigation logs, mapped area and path data, etc.). Other components 1418 may pertain to other hardware, software, and/or circuitry not previously discussed above relative to the behavior manager 1350, such as cache data, data aggregation modules, data augmentation modules, body part component health management, or calibration data management. It should be understood that the behavior manager 1350 may be omitted and/or consumed by one or more models (e.g., RL trained models) that are contained within the local AI system 1470.

3. Perception System

The perception system 1420 may be embodied as any hardware, software, or circuitry for obtaining audiovisual data (e.g., from sensors 1.2.8) and providing this data to the local AI system 1470 for executing AI-based vision techniques (e.g., object detection, image classification, segmentation, object tracking, facial recognition, scene understanding, depth estimation, anomaly detection, reinforcement learning etc.) to generate, from the audiovisual data, one or more three-dimensional (3D) images. The images may further be annotated with contextual data (e.g., foreground/background information, object classification data, labeling, etc.) for additional processing by the local AI system 1470 and the behavior manager 1350. It should be understood that the perception system 1420 may be omitted and/or folded into the local AI system 1470.

4. Local AI System

The local AI system 1470 may be embodied as any combination of hardware, software, or circuitry to drive semi-to fully-autonomous perception, learning, and behavior by the humanoid robot 1. The local AI system 1470 may: (i) include modes or architectures that are run on the disclosed local AI system 1470 only, (ii) include models or architectures where a portion of the model or architecture is run on the local AI system 1470 and another portion of the model or architecture is run on the remote AI system 2780, and (iii) include modes or architectures that are run on the disclosed remote AI system 2780 only. The local AI system 1470 is described in further detail relative to FIG. 8.

Figure 8:
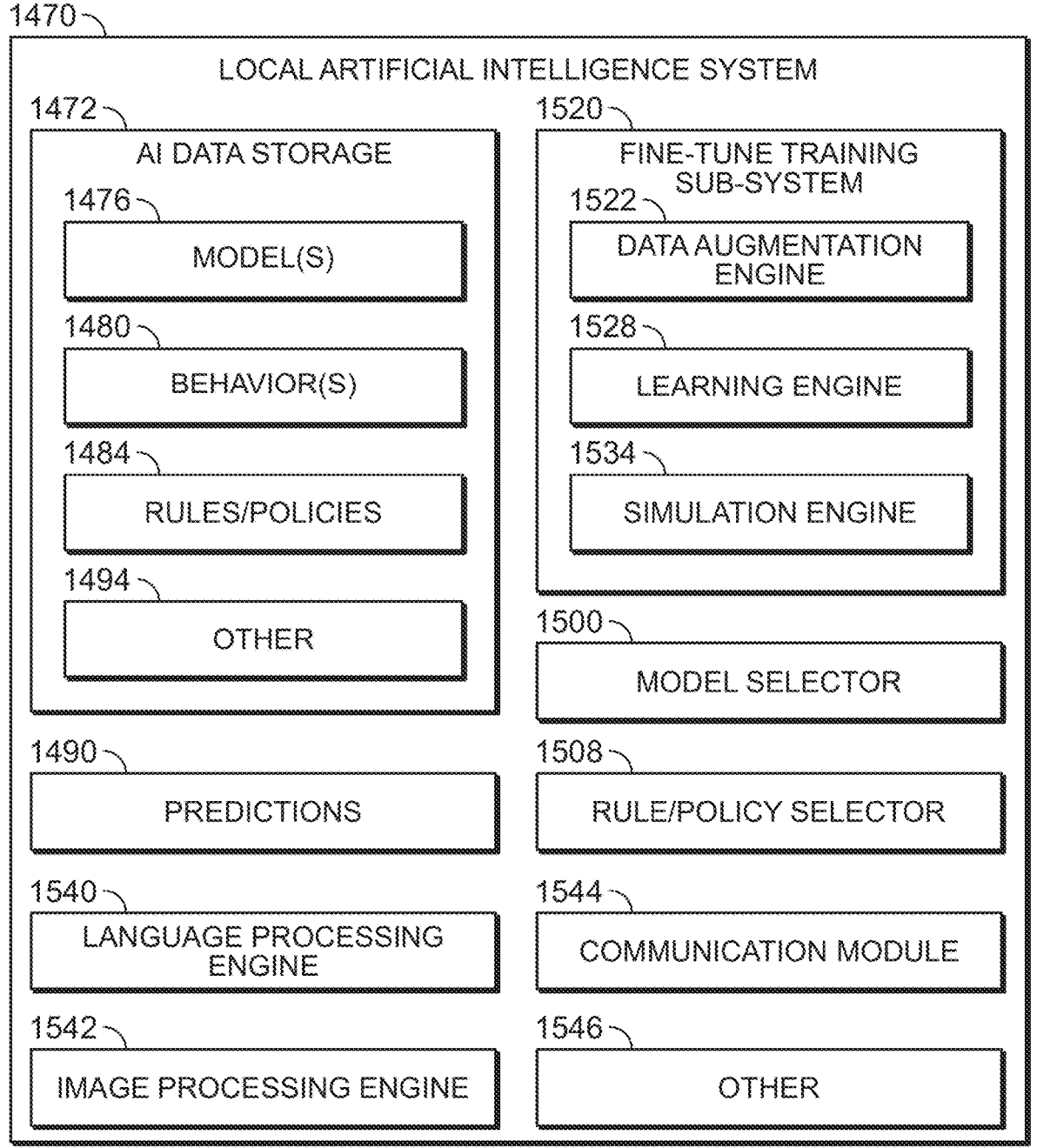
FIG. 8 is a block diagram of an onboard artificial intelligence (AI) system for the humanoid robot of FIGS. 1-3B.

Referring now to FIG. 8, the illustrative local AI system 1470 may include a variety of components, including an AI data storage 1472, predictions 1490, a model selector 1500, a rule and policy selector 1508, a training sub-system 1520, a language processing engine 1540, an image processing engine 1542, and a communication module 1544. However, it should be understood that the local AI system 1470 may interact with and form part of each and every other component (e.g., movement controller 1302, behavior manager 1350, perception 1420, whole body controller 1550, and controllers 1600). As such, in some embodiments, the compute 1000 may only include or primarily include the local AI system 1470. In other words, the local AI system 1470 may not be considered a separate component or system, but instead an integral component of other systems contained within the compute 1000. Thus, one technical challenge addressed by the local AI system 1470 is that of real-time, context-aware decision-making. Traditional robotic systems often rely on pre-programmed responses or remote processing, which can lead to delays or inappropriate actions in dynamic situations. The local AI system 1470 overcomes this limitation by enabling rapid, localized processing of sensory inputs and the immediate generation of appropriate responses.

Another technical challenge addressed by the local AI system 1470 is the integration and interpretation of multimodal sensory data. The humanoid robot 1 is equipped with various sensors, including visual, auditory, tactile, and proprioceptive systems. The local AI system 1470 is configured to fuse these diverse data streams in real-time, a process which creates a comprehensive and coherent internal representation of the state of the humanoid robot 1 and its surrounding environment. This integrated perception allows for more nuanced and accurate interactions with the physical world and human collaborators. The local AI system 1470 also solves the technical issue of adaptive learning and continuous improvement. Unlike static systems, this local AI system 1470 can modify its behavior based on experience and feedback. It employs advanced machine learning algorithms, potentially including deep reinforcement learning and online learning techniques, to continuously refine its decision-making processes. This adaptability allows the robot 1 to improve its performance over time, learn new tasks with minimal explicit programming, and adjust to changes in its operational environment or physical capabilities. A further technical challenge resolved by the local AI system 1470 is the efficient management of the limited computational resources of the robot 1. The local AI system 1470 implements sophisticated task prioritization and resource allocation algorithms, ensuring that high-priority processes receive sufficient computational power while lower-priority tasks are managed in a resource-efficient manner. This dynamic resource management enables the robot 1 to maintain optimal performance across a wide range of operational scenarios, from simple repetitive tasks to complex problem-solving situations.

The AI data storage 1472 may further include one or more models 1476, behaviors 1480, rules and policies 1484, and other data 1494. The models 1476 may comprise one or more AI/ML-based models to perform the functions described herein, such as observing, reasoning, and learning behaviors based on the environment and surroundings and performing simple to complex tasks given the environment and surroundings, e.g., similar to the models 2902 of the remote AI system 2780. The illustrative model selector 1500 is configured to select an appropriate model or set of models 1476 given a specified task, scenario, or constraint. For example, the model selector 1500 may select a given model based on considerations such as the task, a cost to perform the task, performance efficiency, the environment and surroundings, resource management, or the current health status of the humanoid robot 1 or its components. Over time, the model selector 1500 may be refined based on learning algorithms that identify efficient models 1476 for given tasks, scenarios, and constraints. In an embodiment, the model may be selected in response to operator input as an alternative to automated selection. This may be useful, e.g., during the initialization of the humanoid robot 1.

The illustrative rule and policy selector 1508 may be configured to select one or more of the rules and policies 1484 that are stored in the AI data storage 1472 to be enforced during the operation of the humanoid robot 1, e.g., based on operator input given a context, environment, compliance and regulatory jurisdiction, safety considerations, and the like. In an embodiment, the rule and policy selector 1508 may automatically learn efficient methods for adapting to selected rules and policies over time.

The language processing engine 1540 may be embodied as any combination of hardware, software, or circuitry for obtaining, parsing, interpreting, and understanding natural language directives and concepts, and also for generating natural language speech. For example, the language processing engine 1540 may be configured to translate speech-to-text and text-to-speech. The image processing engine 1542 may be embodied as any combination of hardware, software, or circuitry for performing object detection, image classification, segmentation, object tracking, facial recognition, scene understanding, depth estimation, anomaly detection, or reinforcement learning on input visual data (e.g., as obtained by sensors 1.2.8 such as cameras or in preloaded training data).

The training sub-system 1520 may be embodied as any hardware, software, or circuitry configured to refine models 1476 and behaviors 1480 based on observed data and training data. The training sub-system 1520 may include a data augmentation engine 1522, a learning engine 1528, and a simulation engine 1534. The data augmentation engine 1522 may be embodied as any hardware, software, or circuitry configured to increase the size and diversity of training data, similar to the data augmentation engine 2782 of the remote AI system 2780. The learning engine 1528 may be embodied as any hardware, software, or circuitry for training the AI models 1476, given a set of rules and policies 1484, behaviors 1480, and training data, similar to the training engine 2790 of the remote AI system 2780. The simulation engine 1534 may be embodied as any hardware, software, or circuitry for executing one or more of the AI models 1476 in a virtualized simulation environment to simulate and analyze aspects of the humanoid robot 1, such as kinematics, sensor behavior, robot 1 behavior, and anomalies, similar to the simulation engine 2800 of the remote AI system 2780. Compared to the remote AI system 2780, the AI fine-tuning conducted by the local AI system 1470 may be localized to the specific humanoid robot 1, which can be advantageous in situations such as those where the humanoid robot 1 is configured to perform a specific task.

The other 1546 may include a communications module that is embodied as any combination of hardware, software, and/or circuitry to enable components of the local AI system 1470 to communicate with one another and with other components of the humanoid robot 1 (such as of the compute 1000). It should be understood that the controllers may be omitted and/or consumed by one or more models (e.g., RL trained models) that are contained within the local AI system 1470.

5. Whole Body Controller

The whole body controller 1550 may be embodied as any combination of hardware, software, or circuitry for receiving high-level task-space commands and trajectory information from components such as the behavior manager 1350 or the local AI system 1470. The whole body controller 1550 may thereafter send the information to other components of the compute 1000. For example, the whole body controller 1550 may transmit joint torque data, which is data pertaining to rotational forces exerted at "joints" of the humanoid robot 1, to the controllers 1600. It should be understood that the whole body controller 1550 may be omitted and/or consumed by one or more models (e.g., RL trained models) that are contained within the local AI system 1470.

The controllers 1600 may be embodied as any combination of hardware, software, and/or circuitry for transmitting joint torque data to the actuators 1.2.4, e.g., to extend and retract parts (such as arms, hands, fingers of the humanoid robot 1). The controllers 1600 may also infer joint torque and angle data received from other sensors 1.2.8, such as IMUs mounted on a given "body part." In some embodiments, the joint torque and angle data may be measured using rotary position sensors, optical reflection, or other methods. The whole body controller 1550 may also incorporate advanced control strategies, such as passivity-based control or adaptive control, to ensure stability and robustness in the presence of uncertainties or external disturbances. It should be understood that the controllers 1600 may be omitted and/or consumed by one or more models (e.g., RL trained models) that are contained within the local AI system 1470.

6. Other

Other components 1650 of the compute 1000 may include components not discussed above relative to the compute 1000, such as power management modules (e.g., to manage battery pack health, manage power usage profiles, etc.) and calibration modules (e.g., to ensure that actual kinetic movements of the humanoid robot 1 align with the expected kinetic movements determined based on calculations). The humanoid robot 1 may include other components 1.2.18, which can encompass components that do not necessarily fall within the aforementioned mechanical and electrical architecture 1.2, or compute 1000. For example, the other components 1.2.18 may include safety systems and mechanisms, emergency override systems, or ports for connecting peripheral devices.

E. Humanoid Interactions

Figure 9:
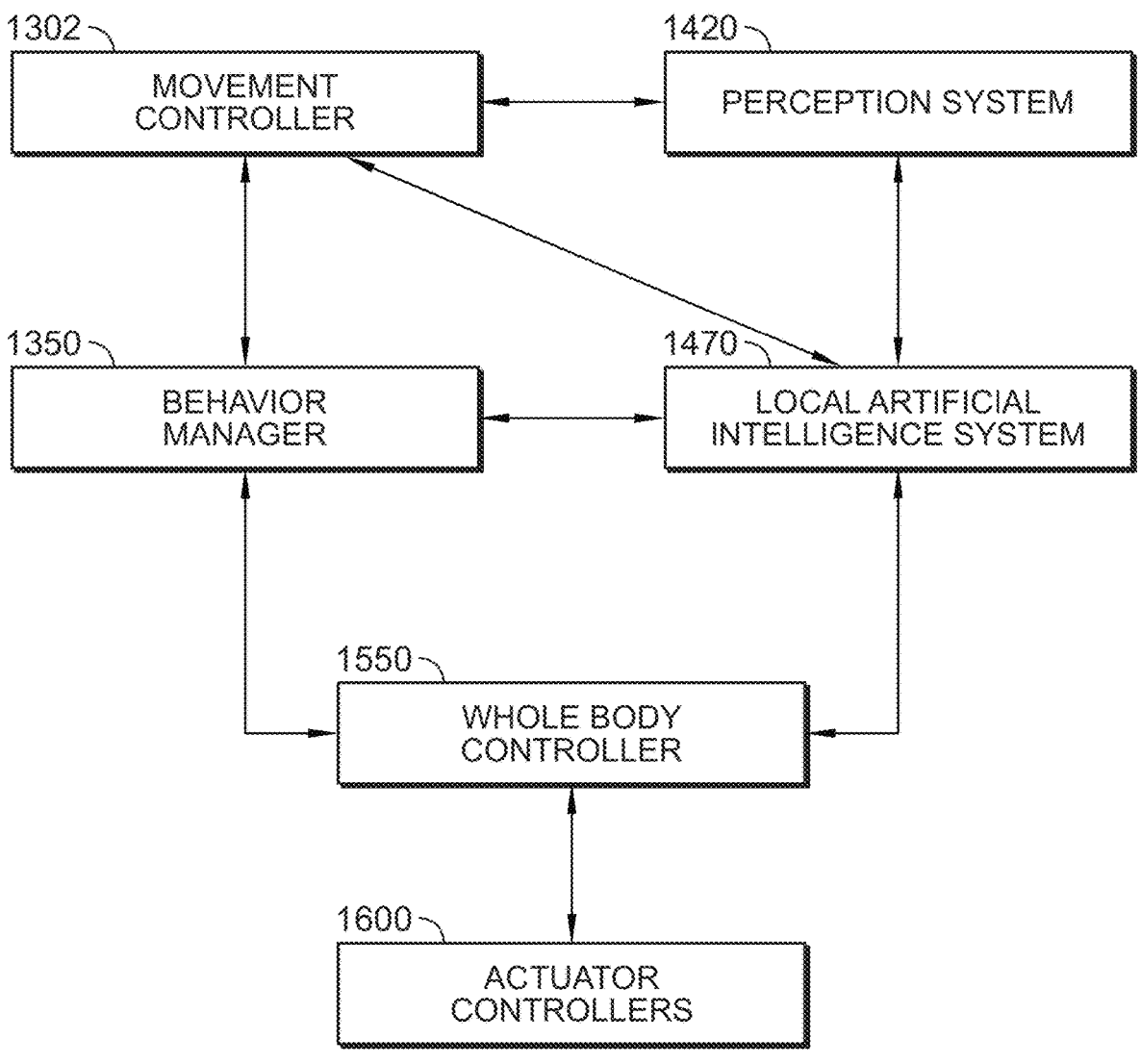
FIG. 9 is a block diagram showing the interactions between components of the humanoid robot of FIGS. 1-3B.

FIG. 9 depicts a diagram illustrating interactions between components of the humanoid robot 1 during its operational state. Upon startup of the humanoid robot 1, the humanoid robot 1 may be in a standby mode or may otherwise remain idle in an initial position (e.g., standing, sitting, lying down, etc.). The robot 1 may initialize and activate its suite of sensors 1.2.8, which may include inertial measurement units (IMUs), joint encoders, force-torque sensors, and cameras, to obtain data in relation to the environment and surroundings of the robot 1, as well as its own internal state, including positional data, audiovisual data, and the like. The movement controller 1302 may be configured to obtain this processed environmental data from the perception system 1420, thereby understanding the location and orientation of the robot 1 within a world model of said environment.

The environmental data, along with the robot's internal state data, can be fed into: (i) the local AI system 1470 and (ii) the behavior manager 1350. The local AI system 1470 can then, for example, convert speech to text in order to obtain long-horizon goals, wherein said local AI system 1470 can subdivide these long-horizon goals into a structured sequence of one or more sub-goals or tasks. The local AI system 1470 can then check with the behavior manager 1350 to confirm that the robot 1 is in the correct state for performing the first sub-goal or task. Once the state of the robot 1 is confirmed, or the state of the robot 1 is changed to be in the appropriate state, the local AI system 1470 can determine the specific movements and actions to perform for a given specified task. For instance, using a Helix architecture, the local AI system 1470 (as a high-level policy, S2) may process the task and sensor data to generate abstract information that is provided to a semantic latent vector, which encodes the intent of the action. This information is passed through the said latent vector and into a reactive policy (S1). The reactive policy (S1) may then communicate the detailed movement or action information, such as end-effector trajectories, to the whole body controller 1550, which in turn generates joint torque data and transmits this data to the actuator controllers 1600 to effect activity in the actuators 1.2.4 and cause the planned movement or action to be performed.

Each of the interacting components may provide feedback information to each other as the movements or actions are being performed, forming a closed-loop control system. For example, the perception system 1420 may relay an indication to the movement controller 1302 that a given task is complete based on audiovisual data, such as confirming an object has reached a target pose. As another example, the behavior manager 1350 may be in continuous communication with the whole body controller 1550 to ensure that the movement and positioning of the robot 1 are as instructed and/or planned by the local AI system 1470 by monitoring state error. As yet another example, the local AI system 1470 may continuously receive data from the perception system 1420, the movement controller 1302, the behavior manager 1350, and the whole body controller 1550 and use this data to refine and optimize the currently executing model given present configurations, conditions, and constraints. It should be understood that the movement controller 1302, behavior manager 1350, perception system 1420, whole body controller 1550, and/or actuator controllers 1600 may be omitted or replaced in some embodiments.

Figure 10:
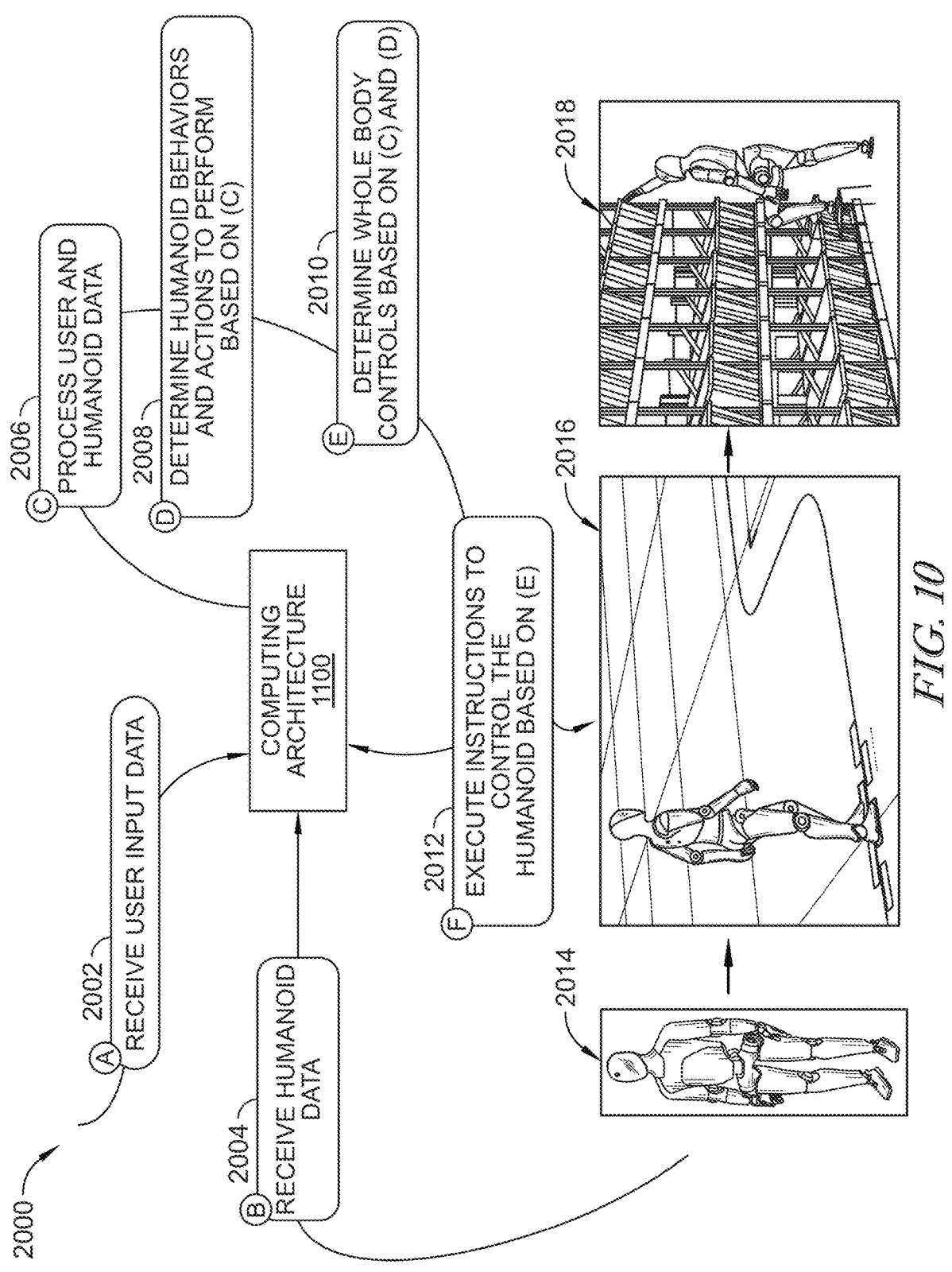
FIG. 10 is a diagram showing operations for a humanoid robot to perform a specified task.

Referring now to FIG. 10, the humanoid robot 1, in operation and via the computing architecture 1100, may execute a method 2000 for operating a humanoid robot 1 to perform a given task. Although the method 2000 is described sequentially herein, one of skill in the art will recognize that some steps may be performed out of order, and further, some steps can be carried out concurrently relative to one another.

As shown, the method 2000 begins in step 2002, in which the computing architecture 1100 receives user input data, e.g., from an operator for a given worksite or command center issuing directives to humanoid robots at the worksite. The user input data may include a selection of an operational mode, one or more behaviors, rules and policies, and models for carrying out a given directive. The user input data may also include a specification of a long-horizon goal or set of tasks received from a plurality of modalities. For example, the user input may be a language-based instruction, such as a voice command or text string, which requires natural language understanding. Alternatively, the input may include a stream of control data generated by a teleoperation device, including but not limited to a wearable teleoperation suit, a joystick, or a game controller, providing direct kinematic or dynamic commands for the humanoid robot 1.

In step 2004, the computing architecture 1100 receives humanoid data relating to a current state of the humanoid robot 1, which may include its center of mass position, joint angles, and contact states. In this example, assume that the humanoid robot 1 is standing in a stationary position (as depicted in graphic 2014). In step 2006, the computing architecture 1100 processes the received user input data and humanoid data. Assume for this example that the user input data includes a long-horizon goal to obtain a part stored in a specified box located on the top of a specified shelf. The computing architecture 1100 may analyze the user input data within the context of the current state provided in the humanoid data. For example, language-based instructions may be processed by the AI systems 1470, 2780 using the Helix model or any other vision-language-action models, to interpret semantic intent and ground the content of the goal to the robot's perception of the environment. The system may then perform decision making algorithms given the current state and specified constraints, configurations, and other factors identifiable in the user input data and the humanoid data. This initial processing stage normalizes the user's intent into a standardized command format, irrespective of the input modality, for subsequent action generation.

Upon processing the user input, one possible method for action generation involves a direct inference pathway utilizing an AI module, such as a visuomotor model or a comprehensive vision-language-action (VLA) model (e.g., the Helix architecture) from the AI systems 1470, 2780. This AI module can be configured to receive and fuse multiple data streams concurrently: the standardized user command, real-time sensory data including vision data from one or more camera sensors of the robot, and internal robot state data, such as proprioceptive information detailing current joint angles and velocities. By processing these fused inputs through a trained neural network, the model directly generates a sequence of robot action commands. These commands can be sufficiently low-level to directly instruct the whole-body controller 1550, thereby bypassing the need for an explicit, multi-stage planning and optimization architecture for certain reactive tasks.

Alternatively, the computing architecture 1100 may employ a hierarchical planning and control architecture. Following the initial interpretation of the user input, the command is routed to a high-level task planner, such as the movement controller 1302. The movement controller 1302 can be configured to decompose the primary command into a sequence of executable subtasks, plan navigational paths through an environment, and allocate system resources. The output of this planning can be a strategic sequence of objectives, which is then passed to the behavior manager 1350 for execution. The behavior manager 1350 may then engage its model predictive controller (MPC) engine 1364 to perform high-level control and optimization. Specifically, the MPC engine 1364 may utilize a predictive model of the robot's dynamics, such as the linear inverted pendulum model, to forecast the robot's state over a future time horizon. It then solves an optimization problem at each time step to generate an optimal trajectory for the robot's center of mass (COM) and a sequence of discrete footstep placements that satisfy stability constraints, such as keeping the zero moment point (ZMP) within the support polygon, while progressing toward the subtask goal provided by the movement controller 1302. The output of the MPC engine 1364 may not be direct joint commands, but rather a set of task-space trajectories that define the intended motion. These trajectories can then be communicated to the low-level whole-body controller 1550, which can utilize inverse kinematics to compute the precise joint torques and angles necessary to realize the planned motion, thereby actuating the robot's limbs to execute the walking behavior or other actions, as laid out in more details in the following steps.

In step 2008, the computing architecture 1100 may determine humanoid behaviors and actions to perform based on the processed user input data and humanoid data. For example, once the computing architecture 1100 understands the long-horizon goal, the computing architecture 1100 may subdivide the goal into tasks performable by the humanoid robot 1, such as identifying the shelf, identifying the location of the box on the shelf, generating a path and trajectory for navigating to the shelf, walking toward the shelf, grasping the box, setting the box on a surface, and searching for the part within the box. The tasks may be further subdivided into more discrete movements, such as moving a given body part, like an end-effector, at a specified angle, velocity, or orientation.

In step 2010, the computing architecture 1100 may determine whole body controls based on the processed data and the determined behaviors and actions. For example, the computing architecture 1100 may map each task to a given sequence of actions to be performed by the humanoid robot 1, which in turn may be translated into control inputs like joint torque data and other kinetic information to be sent to the actuators 1.2.4 to achieve performance and completion of each task. In step 2012, the humanoid robot 1 executes the instructions to control the humanoid robot 1 based on the whole body controls. The instructions may be converted into electrical signals that are transmitted to the actuators 1.2.4 to cause the appropriate movement, such as movement along a path and trajectory as depicted in graphic 2016.

In an embodiment, as the humanoid robot 1 performs the specified tasks, the computing architecture 1100 continues to collect and process sensor data, which can be used in learning and identifying additional tasks or subtasks to be performed. Continuing the present example, while moving along the path, the humanoid robot 1 may identify (e.g., based on visual sensor data and object recognition techniques, such as convolutional neural networks, applied to the visual sensor data) a step stool for accessing the top shelf where the box containing the part is located. The computing architecture 1100 may perform additional decision making techniques on the newly observed data (e.g., to determine whether using the stepstool is beneficial given current constraints or configurations for the humanoid robot 1) and determine additional behaviors and actions to perform, such as picking up the step stool, placing the step stool in front of the shelf, and climbing the step stool to reach the box on the shelf, as depicted in graphic 2018.

F. Whole Body Controller

Figure 11:
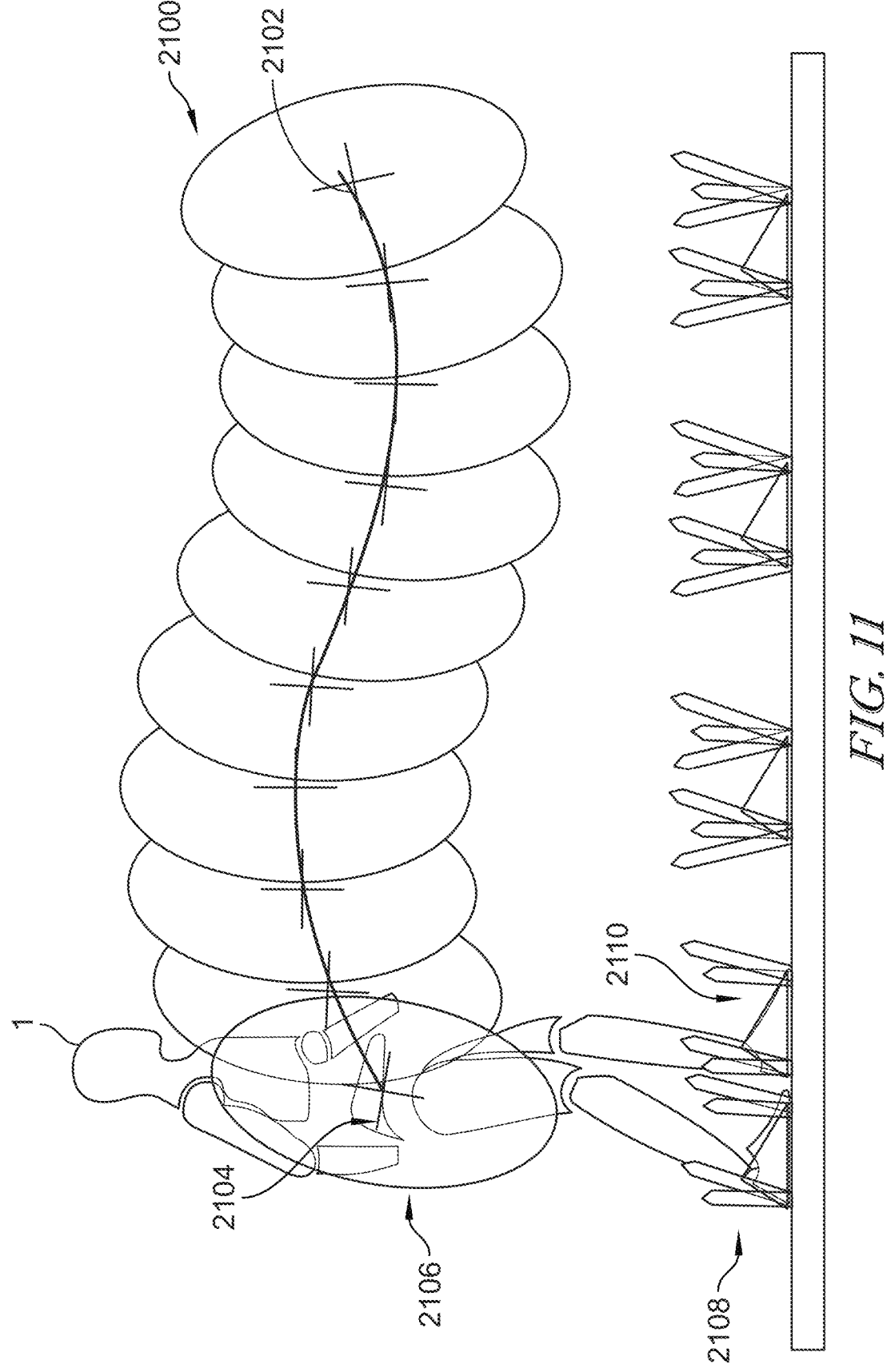
FIG. 11 is a diagram showing movement of the humanoid robot of FIGS. 2-3B along a trajectory based on centroidal dynamics.

Referring now to the diagram 2100 of FIG. 11, in operation, the whole body controller 1550 controls movements of components of the humanoid robot 1 to follow a trajectory based on centroidal dynamics while simultaneously attempting to satisfy a variety of other tasks, such as hand and/or foot movement and controlling body shape. In doing so, from a nominal plan, such as a straight line through space, the whole body controller 1550 operates the joints of the humanoid robot 1 (e.g., by sending corresponding joint parameters to actuator controllers 1600 to apply defined torques) to follow a dynamically feasible trajectory 2102. A dynamically feasible trajectory is one that adheres to the physical laws of motion given the robot's mass and inertia. Along this trajectory, a center of mass 2104, an angular momentum about the center of mass 2106, linear momentum, and angular momentum are tracked as states of the humanoid robot 1. Further, parameters associated with actions performed by the humanoid robot 1 may be defined in terms of contact force(s) 2108, contact location(s) 2110, and contact duration. The whole body controller 1550 enforces motions that attempt to track a centroidal reference or trajectory. In doing so, the whole body controller 1550 uses instantaneous full system dynamics, operating on the present instance in time without a predictive control horizon or lookahead capability. This approach allows the controller to resolve a stack of possibly competing tasks-which may include tasks related to centroidal motion, full-body task motions, and external contact forces-simultaneously into a single, dynamically feasible control action, such as a set of joint torques for the actuators 1.2.4. This instantaneous resolution provides high reactivity to disturbances.

Figure 12:
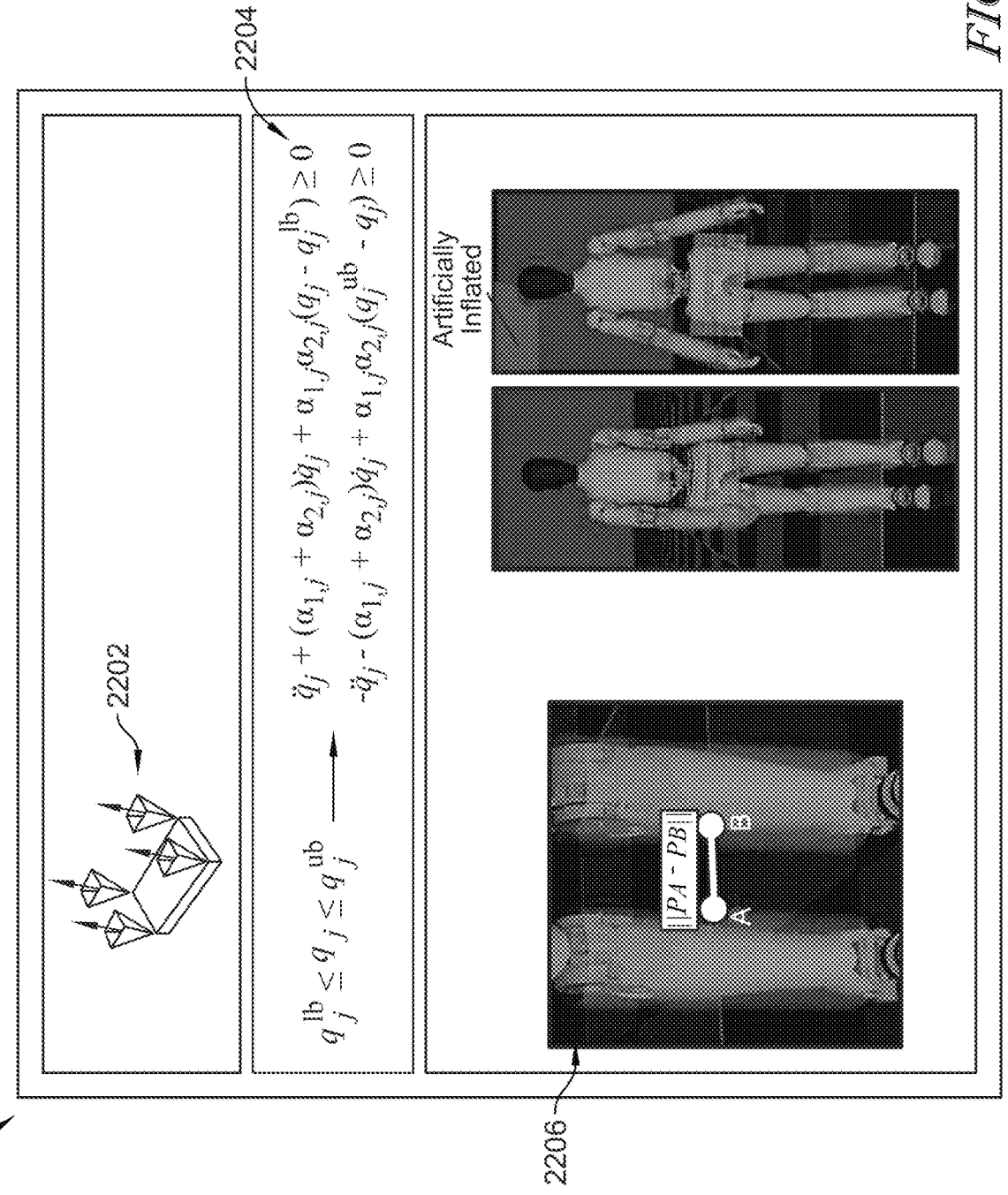
FIG. 12 is a diagram showing a set of factors utilized by a whole body controller to control movement of the humanoid robot of FIGS. 2-3B.

Referring now to the diagram 2200 of FIG. 12, the whole body controller 1550, in the illustrative embodiment, performs whole body torque control given a centroidal trajectory (e.g., the trajectory 2102 of FIG. 11), one or more link orientation targets (e.g., for the torso, feet, etc.), target foot and/or hand positions, and contact forces (e.g., the force(s) 2108 of FIG. 11) with the environment. Further, in doing so, the whole body controller 1550 enforces torque limits, the physics of contact with the environment, such as through friction cones 2202 (e.g., each a geometric representation of possible forces that can be applied through frictional contact between two surfaces without causing slippage), joint position limits 2204, and other safety considerations, such as avoidance of self-collisions (e.g., collisions between legs, as represented in the diagram 2206). These safety considerations may be defined and enforced as control barrier function(s). Control barrier functions enhance safety by constraining control inputs at each time step to cause a system state to remain within a predefined desired safe region of the state space.

Figure 13:
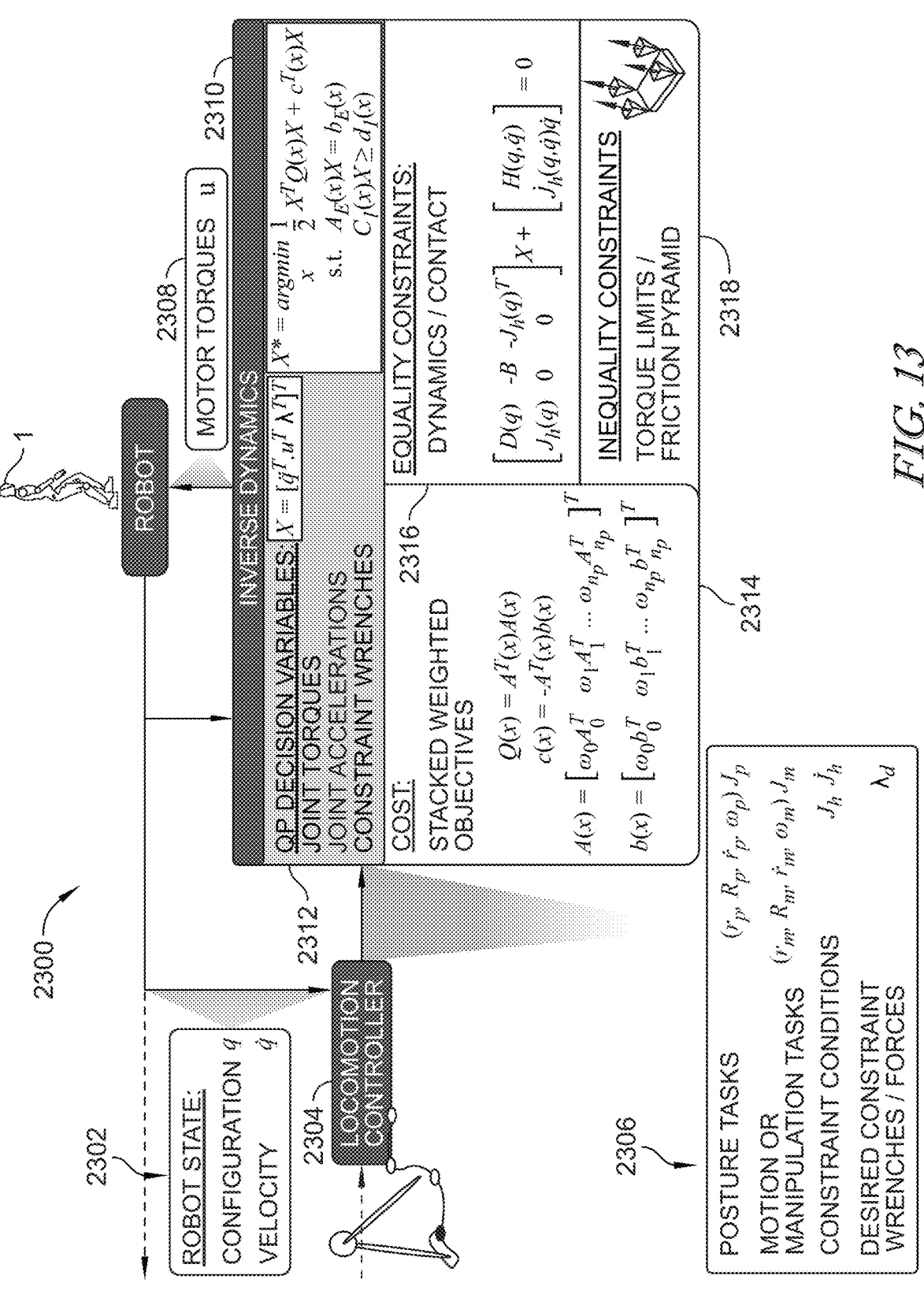
FIG. 13 is a diagram showing a formulation of operations of the whole body controller of the humanoid robot of FIGS. 2-3B.

Referring now to FIG. 13, a diagram 2300 represents a formulation of operations performed by the whole body controller 1550 in an illustrative embodiment. As indicated in the diagram 2300, a state 2302 of the humanoid robot 1 may be defined as a configuration (e.g., the position of each joint) and a velocity of each joint. A locomotion controller 2304, which may be embodied as hardware, software, or a combination thereof associated with the whole body controller 1550, operates on the basis of a set of responsibilities 2306 that, in the illustrative embodiment, include one or more posture tasks, motion or manipulation tasks, constraint conditions, and/or desired constraint wrenches or forces. To satisfy these tasks, the whole body controller 1550 provides instructions (e.g., joint parameters) to the actuator controllers 1600, such as in the form of motor torques 2308. To determine the instructions (e.g., the motor torques 2308), the whole body controller 1550 performs calculations based on inverse dynamics 2310. In doing so, the whole body controller 1550, in the illustrative embodiment, solves an inverse dynamics problem that is formulated as a quadratic program (QP). The decision variables 2312 for this QP may include joint torques, joint accelerations, and constraint wrenches (forces and torques at contact points). This formulation allows for the efficient computation of a solution that satisfies multiple objectives and constraints. In this process, the whole body controller 1550 accounts for cost(s) 2314, which may include a set of stacked weighted objectives (e.g., in which objectives with greater weights are prioritized over objectives with lesser weights). That is, the whole body controller 1550, in the illustrative embodiment, executes an optimization function to minimize a cost function that represents a summation of costs associated with the stacked weighted objectives. By adjusting the weights, the relative priority of each objective can be tuned. Further, in solving the inverse dynamics problems, the whole body controller 1550 accounts for equality constraints 2316, such as the equations of motion and contacts with the environment, as well as inequality constraints 2318, such as torque limits and/or friction pyramids or friction cones (e.g., similar to the friction cones 2202 of FIG. 12).

Figure 14:
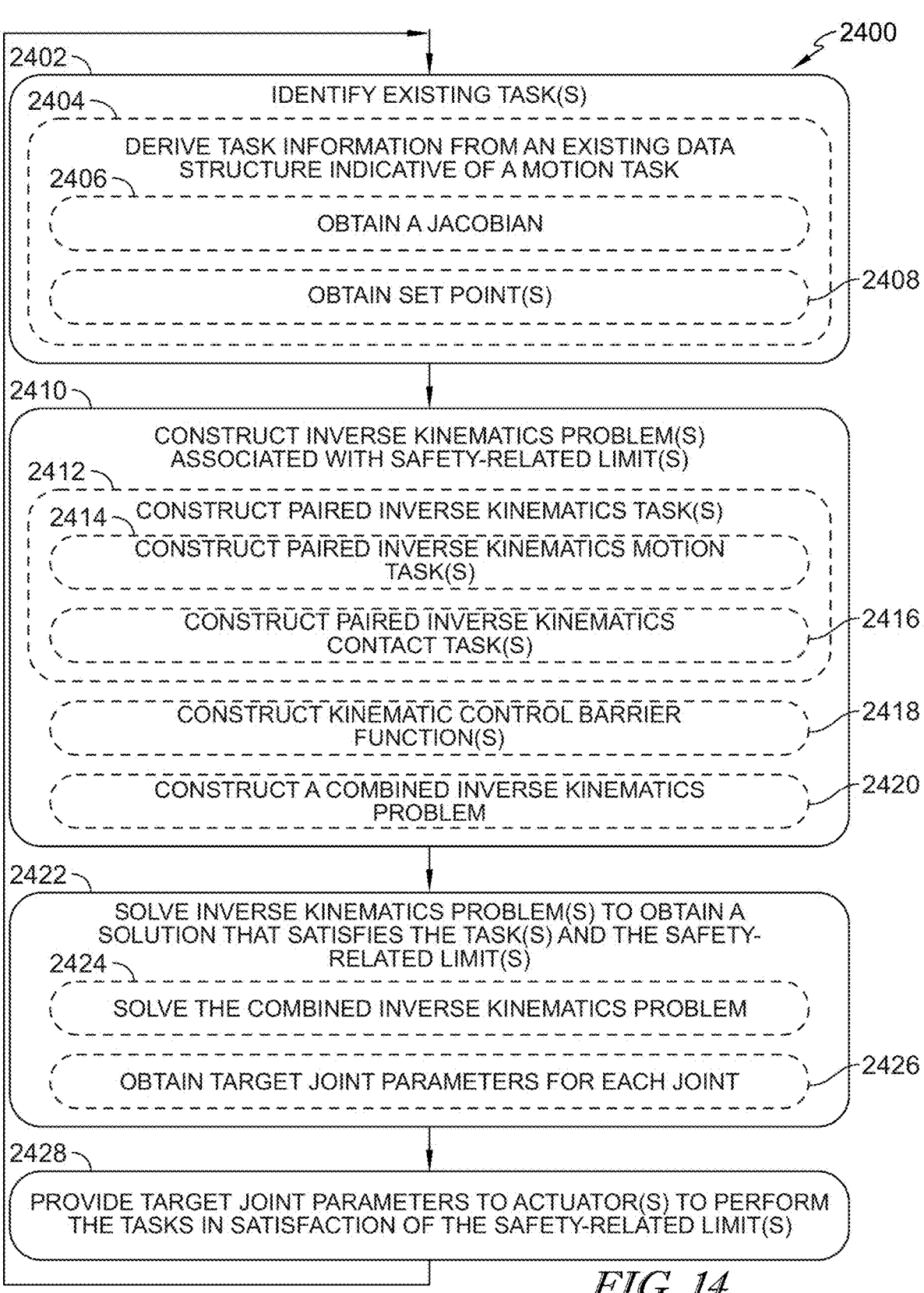
FIG. 14 is a flowchart of a method that may be performed by the whole body controller of the humanoid robot of FIGS. 2-3B to efficiently determine joint parameters to perform a task while maintaining compliance with a set of safety-related limitations.

Referring now to FIG. 14, the whole body controller 1550, in operation, may perform a method 2400 for efficiently achieving a set of tasks defined in task space while efficiently maintaining compliance with one or more safety-related limitations. That is, the whole body controller 1550 may execute the method 2400 to perform efficient regularization of control instructions (e.g., joint parameters) to maintain compliance with the safety-related limitations. In the illustrative embodiment, the method 2400 begins in block 2402 in which the whole body controller 1550 identifies an existing task (e.g., a task that is defined in a task space). In doing so, the whole body controller 1550, in the illustrative embodiment, derives task information from an existing data structure (e.g., defined in a memory utilized by the whole body controller 1550) that is indicative of properties or characteristics of a particular task, such as a motion task, as indicated in block 2404. As indicated in block 2406, the whole body controller 1550 may obtain a Jacobian associated with the task. The Jacobian is a matrix that defines a mapping between parameter spaces, such as between the task space (e.g., target Cartesian positions of feet, hands, etc. in the environment) and a robot configuration space (e.g., joint angles/positions, joint velocities). Further, in the illustrative embodiment, the whole body controller 1550 obtains one or more set points for the humanoid robot 1, as indicated in block 2408.

Continuing the method 2400, the whole body controller 1550, in block 2410, establishes one or more safety-related limits. It then proceeds to construct one or more inverse kinematics problems associated with these safety-related limits, as indicated in block 2412. In doing so, and as indicated in block 2412, the whole body controller 1550 may construct one or more paired inverse kinematics task(s) (e.g., phantom tasks or phantom inverse kinematics task) associated with the existing task(s) from block 2402. As indicated in block 2414, the whole body controller 1550 may construct one or more paired inverse kinematics motion tasks (e.g., associated with motions to be performed by the humanoid robot 1). Additionally or alternatively, the whole body controller 1550 may construct one or more paired inverse kinematics contact tasks (e.g., associated with contact(s) between the humanoid robot 1 and one or more objects in the environment), as indicated in block 2416. Further, and as indicated in block 2418, the whole body controller 1550 may construct one or more kinematic control barrier functions, similar to the control barrier functions associated with joint position limits 2204 referenced above in connection with FIG. 12. Additionally, the whole body controller 1550 constructs a combined inverse kinematics problem that incorporates any existing inverse kinematics problems (e.g., associated with the existing tasks), the paired inverse kinematics tasks, and the control barrier functions, as indicated in block 2420.

In the illustrative embodiment, the method 2400 continues in block 2422, in which the whole body controller 1550 solves the inverse kinematics problem(s) (e.g., obtained in the previous operations) to obtain a solution that satisfies the task(s) (e.g., from block 2402) and the safety-related limits (e.g., from block 2410). In doing so, in the illustrative embodiment, and as indicated in block 2424, the whole body controller 1550 solves the combined inverse kinematics problem (e.g., from block 2420). Further, the whole body controller 1550 obtains target joint parameters from the solution. The solution to the inverse kinematics problem provides target positions and/or velocities for joints of the humanoid robot 1. The whole body controller 1550, in response, determines corresponding torques for the joints of the humanoid robot 1, as indicated in block 2426. Subsequently, and as indicated in block 2428, the whole body controller 1550 provides (e.g., sends) the target joint parameters (e.g., torques) to one or more actuators 1.2.4 (via the actuator controllers 1600) to perform the task(s) (e.g., from block 2402) in satisfaction of (e.g., in compliance with) the safety-related limit(s) (e.g., from block 2410).

In an example implementation of the method 2400, the whole body controller 1550 may provide phantom inverse kinematics, in which the whole body controller 1550 regulates a number of Cartesian or abstract tasks that do not generally regularize the pose of the humanoid robot 1 to a reasonable (e.g., balanced, safe) configuration. To achieve this regularization, the phantom inverse kinematics process automatically derives task information from existing motion task structures. This information includes the task Jacobian, which maps joint velocities to task-space velocities, and task set points, which define the desired state or goal in the task space. Further, in performing phantom inverse kinematics, the whole body controller 1550 may evaluate phantom task types at a paired skeleton math pose, whose configuration is driven by a differential inverse kinematics solver.

Additionally, in performing phantom inverse kinematics, the whole body controller 1550 considers known contacts with the environment and generates a phantom pose. This phantom pose, which represents a stable and balanced configuration, can then be used as an additional cost in a subsequent optimization problem solved by the whole body controller 1550, thereby regularizing the robot's behavior. The differential inverse kinematics problem for determining the phantom pose may be formulated as a quadratic program (QP), as set forth in Equations 1, 2, and 3 below. This formulation seeks to find an optimal joint velocity that minimizes a quadratic cost function subject to linear equality and inequality constraints.

$$X* = \operatorname{argmin}_X \frac{1}{2} X^T G(x)X + g^T(x)X \tag{1}$$

$$A_E(x)X = b_E(x) \tag{2}$$

$$C_I(x)X \geq d_I(x) \tag{3}$$

In the above Equations 1, 2, and 3, X represents the decision variables for the optimization problem. In the present case, the generalized velocities q are solved. All costs for the problem are posed as linear least squares tasks of the form provided below.

$$\frac{1}{2}\|Ax - b\|_W^2 \tag{4}$$

In Equation 4, where A is a task Jacobian and b is a task error, the term W represents an associated task weighting, which may be expressed as a diagonal matrix to scale the priority of the task. A linear least squares cost type internally translates the above into a cost that can be posed to a linear least squares solver as shown below.

$$G = A^T Wa \tag{5}$$

$$g = -A^T Wb \tag{6}$$

In the example implementation, the whole body controller 1550 may utilize a phantom motion task structure, representing a thinly defined task that directly pairs to a motion task structure (e.g., already defined in memory) to generate a corresponding Jacobian and task error for regularization. In the example implementation, motion task types at the acceleration level (e.g., defined in a problem to be solved by the whole body controller 1550) are tasks designed to satisfy the cost expressed below.

$$J(q)\ddot{q} + j(q, \dot{q})\dot{q} = K_P\big(x^d - x(q)(q)\big) + K_D\big(\dot{x}^d - \dot{x}(q, \dot{q})\dot{e}(q, \dot{q})\big) + \ddot{x}^d \tag{7}$$

In Equation 7, where J is the task Jacobian, q is the generalized coordinate vector, and xd is the desired task-space trajectory, the terms e(q) and ė(q, q) represent the task error and the derivative of the task error, respectively. The linear least squares costs formed by the expression above is expressed below.

$$A_{motion}(q) = J(q) \tag{8}$$

$$b_{motion}(q, \dot{q}) = K_P\big(x^d - x(q)e(q)\big) + K_D\big(\dot{x}^d - \dot{x}(q, \dot{q})\dot{e}(q, \dot{q})\big) + \ddot{x}^d - j(q, \dot{q})\dot{q} \tag{9}$$

In view of the above equations, a phantom motion task structure can directly re-utilize the set point and Jacobians from a primary motion task to form a corresponding cost for use in a phantom inverse kinematics solver below.

$$J_c(q)\ddot{q} + \dot{J}_c(q, \dot{q})\dot{q} = 0 \tag{10}$$

In Equation 10 above, $q_p$ represents a phantom configuration, which is the current pose of a virtual phantom robot, and the desired task trajectories $x^d$ and $\dot{x}^d$ are obtained from the primary motion task structure. Accordingly, a phantom motion task cost is defined as follows.

$$A_{motion}^{IK}(q_p) = J(q_p) \tag{11}$$

$$b_{motion}^{IK}(q_p) = K_P^{IK}e(q_p) + \dot{x}^d \tag{12}$$

The whole body controller 1550, in the example implementation, may utilize a phantom contact task, which may be embodied as a data structure that represents a contact soft constraint as a linear least squares task paired to a contact acceleration task structure, similar to how motion tasks are paired to phantom motion tasks, as described above. The constraints may be defined, in some embodiments, as having three degrees of freedom for point contacts or six degrees of freedom for surface contacts. A soft holonomic constraint may form an equality constraint on acceleration of a contact, as represented below.

$$J_c(q)\ddot{q} + \dot{J}_c(q, \dot{q})\dot{q} = 0 \tag{13}$$

The phantom contact task may then re-utilize the mathematical framework defined above to transform the holonomic constraint into a soft constraint, which is imposed as a cost in the optimization problem, as represented in Equation 14. Treating the contact as a soft constraint allows the solver to find solutions that permit minor, transient violations of the contact constraint if doing so is advantageous for satisfying other, higher-priority objectives.

$$J_c(q_p)\dot{q}_p = K_{P,c}e(q, q_p) \tag{14}$$

In Equation 14, $q_p$ represents the phantom configuration and the term e (q, $q_p$) represents the difference between the current measured contact state $p_c(q)$ and the phantom contact state $p_c(q_p)$. The final cost associated with this phantom contact task is shown below.

$$A_c^{IK}(q_p) = J_c(q_p) \tag{15}$$

$$b_c^{IK}(q_p) = K_{P,IK}e(q_p) \tag{16}$$

Additionally, in the example implementation, the whole body controller 1550 utilizes control barrier functions (CBF) to impose kinematic constraints on the humanoid robot 1. A non-linear control-affine system may be represented as shown in below.

$$\dot{x} = f(x) + g(x)u \tag{17}$$

In the above equation, $x \in R^n$ is the system state and $u \in R^m$ is the control input. Control barrier functions are built on the concept of guaranteeing safety in the form of forward invariance on a safe set C, which is defined as the zero super level set of a continuously differentiable function $h(x)$ as shown below.

$$h(x): R^n \to R \qquad (18)$$

$$C = \{x \in R^n \mid h(x) \geq 0\} \qquad (19)$$

If the solution of $x(t) \in C$ for all time t, then the system remains safe and the set C is forward invariant. In a system with generalized coordinates $q \in R^{nq}$ where the barrier function coordinates h depend on q, the time derivative can be expressed below.

$$\dot{h}(q, \dot{q}) = \frac{\partial h(q)}{\partial q} \dot{q} \qquad (20)$$

The resulting barrier constraint, which ensures the state does not exit the safe set C, is as follows.

$$\dot{h}(q, \dot{q}) \geq -\alpha h(q) \qquad (21)$$

In Equation 21, the term $\alpha \in R_+$ is a tunable class K function parameter that dictates how rapidly the state is repelled from the boundary of the safe set. In the context of task space constraints to be enforced on the humanoid robot 1, the evolution of tasks variables at the kinematic level, as shown below.

$$\dot{x} = J_x(q)\dot{q} \qquad (22)$$

For joint limits, the task Jacobian $J_x$ is an identity matrix, as the task space is the joint space itself. A kinematic control barrier function for the j-th joint on the humanoid robot 1, based on the above, is formulated as follows.

$$\dot{q}_j + \alpha_j\left(q_j - q_j^{lb}\right) \geq 0 \qquad (23)$$

$$-\dot{q}_j + \alpha_j\left(q_j^{ub} - q_j\right) \geq 0 \qquad (24)$$

Based on the above costs and constraints, the whole body controller 1550 may determine an overall algorithm for the phantom inverse kinematics corresponding to the operations of the method 2400. Before solving the phantom inverse kinematics problem, the whole body controller 1550 updates the task desired positions and velocities and then uses them to solve for a target velocity for the phantom state $$\dot{q}_p^*,$$

as shown in Equation 25 below. The overall process may involve two distinct solver stages. A first inverse kinematics solver, which may be a differential inverse kinematics solver, is used to derive the phantom pose by solving the quadratic problem of Equation 25. The resulting phantom pose is then incorporated as an additional cost into a revised problem. This revised problem is then solved by a second inverse kinematics solver, which may be a full inverse dynamics solver that determines the final motor torques 2308.

$$\dot{q}_p^* = \operatorname{argmin}_{\dot{q}_p} \frac{1}{2}\left\|A_{motion}^{IK}\dot{q}_p - b_{motion}^{IK}\right\|_W^2 + \frac{1}{2}\left\|A_c^{IK}\dot{q}_p - b_c^{IK}\right\|_W^2 \qquad (25)$$

G. Alternative Embodiments

In an alternative embodiment, the architecture may be modified to integrate predictive control into the low-level controller more deeply. In this embodiment, the whole body controller 1550 itself is formulated as a Model Predictive Control (MPC) problem. Instead of solving a quadratic program (QP) for decision variables 2312 that represent only the current instance in time (e.g., instantaneous joint torques and accelerations), the optimization would be solved over a future time horizon. The decision variables would comprise a sequence of joint torques, joint accelerations, and constraint wrenches over a series of future time steps. This formulation would explicitly predict the future evolution of the robot's state 2302 based on a dynamic model. Consequently, constraints such as torque limits, joint position limits 2204, and friction cones 2202 could be enforced not just for the current moment but over the entire prediction horizon, allowing the controller to anticipate and avoid future constraint violations proactively.

In another set of alternative embodiments, the whole body controller 1550 may be augmented or replaced with machine learning components to improve performance, particularly in handling complex, unmodeled dynamics. One such embodiment may utilize Reinforcement Learning (RL). In this configuration, an RL agent, executed as part of the local AI system 1470, could be trained to directly output motor torques 2308 or other low-level control parameters. The state space for this RL agent would include data from the sensors 1.2.8, such as joint angles and velocities, IMU readings from inertial sensors 1.2.8.4, and contact forces derived from torque sensors 1.2.8.2. The action space would correspond to the decision variables of the controller, such as target joint torques. A reward function would be engineered to incentivize task success, maintain balance, minimize energy consumption, and ensure smooth, human-like motion. Through a training process, the RL policy would learn a direct mapping from the robot's state to optimal control actions. This learned policy could either supplement the existing QP solver, for instance by providing a learned cost function or initial guess, or in a more advanced implementation, replace it entirely for certain tasks.

A further learning-based embodiment involves the concept of residual dynamics. In this embodiment, a neural network, managed by the learning engine 1528 within the local AI system 1470, can be trained to learn the difference, or residual, between the predicted accelerations from the simplified analytical model and the true accelerations measured on the robot 1. The inputs to this network would be the robot's current state (e.g., joint positions and velocities) and the commanded motor torques 2308. The network's output—the learned residual dynamics—would then be incorporated as a corrective term within the equality constraints 2316 (e.g., the equations of motion) of the QP formulation in the whole body controller 1550.

In an alternative embodiment, a more flexible and context-aware system for dynamic task prioritization may be employed. This can be achieved through dynamically weighted QP or through hierarchical null-space projection. In a dynamically weighted scheme, the weights associated with each task in the cost function are not static but are continuously adjusted in real-time by a supervisory module, which may reside in the behavior manager 1350 or the local AI system 1470. This module would modulate task priorities based on the robot's state 2302 and sensory input. For example, if inertial sensors 1.2.8.4 detect a high degree of instability, the weight for a balance-maintenance task would be significantly increased, temporarily deprioritizing other objectives such as end-effector positioning. Alternatively, a hierarchical null-space projection approach could be used. In this formulation, tasks are ordered into a strict hierarchy. The controller first solves for the control actions required to satisfy the highest-priority task. Then, for the next task in the hierarchy, it solves for the required actions only within the null space of the first task's Jacobian, ensuring that the second task is accomplished without compromising the first. This process continues down the hierarchy. The order of this hierarchy could be dynamically reconfigured by the local AI system 1470 based on context, providing a robust method for ensuring critical objectives like safety and stability are always met while opportunistically pursuing lower-priority goals.

A further alternative embodiment may implement end-to-end learning models (e.g., a large transformer-based visuo-motor policy) to replace the entire hierarchical stack. Such a model, operating within the local AI system 1470, could be trained to directly map raw sensor inputs (e.g., image streams from visual sensors 1.2.8.6, joint state data, and tactile feedback from touch sensors 1.2.8.10) to low-level motor torques 2308 sent to the actuator controllers 1600. This approach bypasses explicit intermediate representations like state estimation, path planning, and inverse dynamics calculations.

Additionally, another embodiment may improve the performance of the perception system 1420 without extensive human-labeled data, self-supervised learning methods could be employed. The robot 1 could use its own actions as a supervisory signal to learn about its environment. For example, by moving its head 10.1, the robot could train a model to predict how the video feed from its visual sensors 1.2.8.6 will change as a result of that specific motion. This process may allow the robot to learn an intuitive model of physics, object permanence, and depth perception autonomously. Furthermore, to improve the long-term memory data shared between multiple humanoid robots 2700A-X, Federated Learning could be implemented. In this paradigm, each local AI system 1470 would use its own private data to train and improve its local models 1476. Instead of transmitting this raw data to the remote AI system 2780, only the resulting model updates (e.g., parameter gradients) would be shared. The remote AI system 2780 could then aggregate these updates from many robots to train a more robust and capable global model, which can then be distributed back to the individual robots.

Instead of relying solely on kinematic constraints enforced by CBFs, the whole body controller 1550 could use an energy-based approach founded on passivity theory. The controller could monitor and compute the total mechanical energy of the robot 1, including its kinetic energy (from motion) and potential energy (from gravity). The control laws may be designed to ensure that the system is passive, meaning it does not generate energy on its own. During physical interactions with the environment, the controller could modulate joint torques to ensure that any energy injected into the system from external contact is safely dissipated, preventing the robot from entering an unstable, energy-gaining state.

Finally, the system may also use probabilistic safety guarantees to allow for more flexible behavior. In this embodiment, the whole body controller 1550 or the local AI system 1470 could maintain a probabilistic model of the robot's state and its environment, explicitly representing uncertainty from sensor 1.2.8 noise, model inaccuracies, or unpredictable objects. Instead of enforcing a hard, deterministic safe-set boundary, the controller would calculate the probability of the robot entering an unsafe state over a future horizon. The control optimization would then be formulated to select actions that keep this probability of failure below a predefined, acceptable threshold.

H. Industrial Application

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 19/000,626, 19/006,191, 19/033,973, 19/038,657, 19/064, 596, 19/066,122, 19/180,106, 19/223,945, 19/224,109, 19/224,252, 19/249,517, 19/252,392, 19/252,708, 19/286, 240, and 19/319,712; and (iii) U.S. Design patent application Ser. Nos. 29/889,764, 29/928,748, 29/935,680, 29/954, 572, 29/967,462, 29/993,115, and 29/998,761; (iv) U.S. Provisional Patent Application Nos. 63/556,102, 63/557, 874, 63/558,373, 63/561,307, 63/561,311, 63/561,313, 63/561,315, 63/561,317, 63/561,318, 63/564,741, 63/565, 077, 63/573,226, 63/573,528, 63/573,543, 63/574,349, 63/614,499, 63/615,766, 63/617,762, 63/620,633, 63/625, 362, 63/625,370, 63/625,381, 63/625,384, 63/625,389, 63/625,405, 63/625,423, 63/625,431, 63/626,028, 63/626, 030, 63/626,034, 63/626,035, 63/626,037, 63/626,039, 63/626,040, 63/626,105, 63/632,630, 63/632,683, 63/633, 113, 63/633,405, 63/633,920, 63/633,931, 63/633,941, 63/634,042, 63/634,599, 63/634,697, 63/635,152, 63/677, 087, 63/685,856, 63/690,334, 63/692,747, 63/692,765, 63/694,253, 63/694,304, 63/696,507, 63/696,533, 63/697, 793, 63/697,816, 63/700,749, 63/702,185, 63/705,715, 63/706,768, 63/703,454, 63/707,547, 63/707,897, 63/707, 949, 63/708,003, 63/717,945, 63/715,117, 63/715,270, 63/720,222, 63/722,057, 63/753,670, 63/757,440, 63/759, 665, 63/760,617, 63/763,209, 63/766,911, 63/770,620, 63/770,654, 63/772,440, 63/773,078, 63/776,429, 63/792, 520, 63/819,533, 63/837,511, 63/837,536, 63/839,386, 63/839,517, 63/839,612, 63/839,880, 63/839,918, 63/725, 279, and 63/841,314, each of which is expressly incorporated by reference herein in its entirety.

In this Application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A method for controlling a humanoid robot, the method comprising:

identifying a task for the humanoid robot to perform;

establishing a safety-related limit for the humanoid robot;

constructing a phantom inverse kinematics task that is mathematically derived from the identified task, wherein the phantom inverse kinematics task is configured to regularize a pose of the humanoid robot;

formulating a combined inverse kinematics problem that incorporates: (i) the task, (ii) the phantom inverse kinematics task, and (iii) the safety-related limit;

solving the inverse kinematics problem to generate target joint parameters that both: (i) satisfy the task, and (ii) are within the established safety-related limit; and providing the target joint parameters to one or more actuators to effect a physical movement of the humanoid robot.

2. The method of claim 1, wherein the safety-related limit comprises a kinematic control barrier function.

3. The method of claim 2, wherein the kinematic control barrier function is configured to enforce one or more of: a joint position limit, a torque limit, and a friction cone.

4. The method of claim 1, wherein the identified task is an existing motion task and the phantom inverse kinematics task is a phantom motion task paired to the existing motion task.

5. The method of claim 1, wherein the identified task is an existing contact task between the humanoid robot and an object in its environment, and the phantom inverse kinematics task is a phantom contact task paired to the existing contact task.

6. The method of claim 5, wherein the phantom motion task defines a cost function derived from a Jacobian and a set point of the existing motion task.

7. The method of claim 1, wherein the combined inverse kinematics problem is formulated as a quadratic program, and wherein decision variables for the quadratic program includes generalized velocities for the humanoid robot.

8. The method of claim 7, wherein solving the inverse kinematics problem comprises minimizing a cost associated with a set of stacked weighted objectives.

9. The method of claim 7, wherein the quadratic program is solved at a present time instance by a differential inverse kinematics solver without a predictive control horizon.

10. The method of claim 1, wherein the wherein the phantom inverse kinematics task regularizes the pose of the humanoid robot towards a reference pose, and wherein the reference pose is defined by a paired skeleton model.

* * * * *